United States Patent
Ke et al.

(10) Patent No.: US 12,556,959 B2
(45) Date of Patent: Feb. 17, 2026

(54) METHOD FOR SUPPORTING TIME SENSITIVE COMMUNICATION AND COMMUNICATIONS DEVICE

(71) Applicant: VIVO MOBILE COMMUNICATION CO., LTD., Guangdong (CN)

(72) Inventors: Xiaowan Ke, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 849 days.

(21) Appl. No.: 17/372,576

(22) Filed: Jul. 12, 2021

(65) Prior Publication Data

US 2021/0345157 A1 Nov. 4, 2021

Related U.S. Application Data

(63) Continuation of application No. PCT/CN2020/070878, filed on Jan. 8, 2020.

(30) Foreign Application Priority Data

Jan. 11, 2019 (CN) .................. 201910028869.X

(51) Int. Cl.
*H04W 28/02* (2009.01)
*H04W 8/24* (2009.01)
*H04W 92/18* (2009.01)

(52) U.S. Cl.
CPC ......... *H04W 28/0236* (2013.01); *H04W 8/24* (2013.01); *H04W 28/0268* (2013.01); *H04W 92/18* (2013.01)

(58) Field of Classification Search
None
See application file for complete search history.

(56) References Cited

U.S. PATENT DOCUMENTS 9,749,147 B2    8/2017   Joy
10,044,524 B1    8/2018   Edelhaus et al.
(Continued)

FOREIGN PATENT DOCUMENTS

CN        1658611 A    8/2005
CN     103597778 A   12/2014
(Continued)

OTHER PUBLICATIONS

NPL—U.S. Appl. No. 62/769,372, filed Nov. 19, 2018 (Year: 2018).*

(Continued)

*Primary Examiner* — Andre Tacdiran
(74) *Attorney, Agent, or Firm* — Price Heneveld LLP

(57) ABSTRACT

A method for supporting time-sensitive communication and a communications device are provided. The method for supporting time-sensitive communication applied to a first communications device includes: transmitting first information and/or second information; where the first information includes at least one of the following: first capability information of a terminal UE and information related to a delay between the UE or a radio access network (RAN) network element; and the second information includes at least one of the following: a type of the UE, a type of time-sensitive networking, or indication information of whether time-sensitive data stream configuration information is required.

20 Claims, 8 Drawing Sheets

(56) References Cited

U.S. PATENT DOCUMENTS

| | | | |
|---|---|---|---|
| 2012/0060043 A1* | 3/2012 | Kim | G06F 1/3278 |
| | | | 713/320 |
| 2012/0208562 A1* | 8/2012 | Wilkin | H04L 43/091 |
| | | | 455/456.3 |
| 2012/0314597 A1 | 12/2012 | Singh et al. | |
| 2013/0138800 A1* | 5/2013 | Gelter | H04L 65/80 |
| | | | 709/224 |
| 2013/0152178 A1* | 6/2013 | King | H04W 12/06 |
| | | | 726/6 |
| 2015/0365255 A1 | 12/2015 | Gunther | |
| 2016/0295494 A1* | 10/2016 | Gulati | H04W 72/542 |
| 2017/0099118 A1 | 4/2017 | Negalaguli et al. | |
| 2018/0006955 A1 | 1/2018 | Bush et al. | |
| 2018/0331808 A1* | 11/2018 | Li | H04L 1/1835 |
| 2018/0331875 A1* | 11/2018 | Abedini | H04W 8/245 |
| 2019/0327606 A1* | 10/2019 | Qiu | H04W 28/20 |
| 2021/0194819 A1* | 6/2021 | Chen | H04L 47/193 |
| 2021/0226902 A1* | 7/2021 | Li | H04L 41/0895 |
| 2021/0250787 A1* | 8/2021 | Kolding | H04L 47/283 |
| 2021/0274375 A1* | 9/2021 | Li | H04W 28/10 |
| 2022/0021624 A1* | 1/2022 | Sachs | H04L 47/28 |
| 2022/0030530 A1* | 1/2022 | Munz | H04J 3/0667 |

FOREIGN PATENT DOCUMENTS

| | | | |
|---|---|---|---|
| CN | 105282213 A | | 1/2016 |
| CN | 201811378042.3 | * | 11/2018 |
| EP | 3264725 A1 | | 1/2018 |
| WO | WO2016086623 | * | 9/2016 |

OTHER PUBLICATIONS

"3rd Generation Partnership Project; Technical Specification Group Services and System Aspects; Study on 5GS Enhanced Support of Vertical and LAN Services (Release 16)", 3GPP TR 23.734 V0.3.0 (Oct. 2018), Valbonne, France.

Huawei, "Updates on Solution #18", 3GPP TSG-SA WG2 Meeting #129Bis, S2-1812232, West Palm Beach, USA, Nov. 26-Nov. 30, 2018.

Chinese Office Action, for Application No. 201910028869.X, dated Dec. 21, 2020.

Written Opinion and International Search Report for Application No. PCT/CN2020/070878, dated Jul. 22, 2021.

* cited by examiner

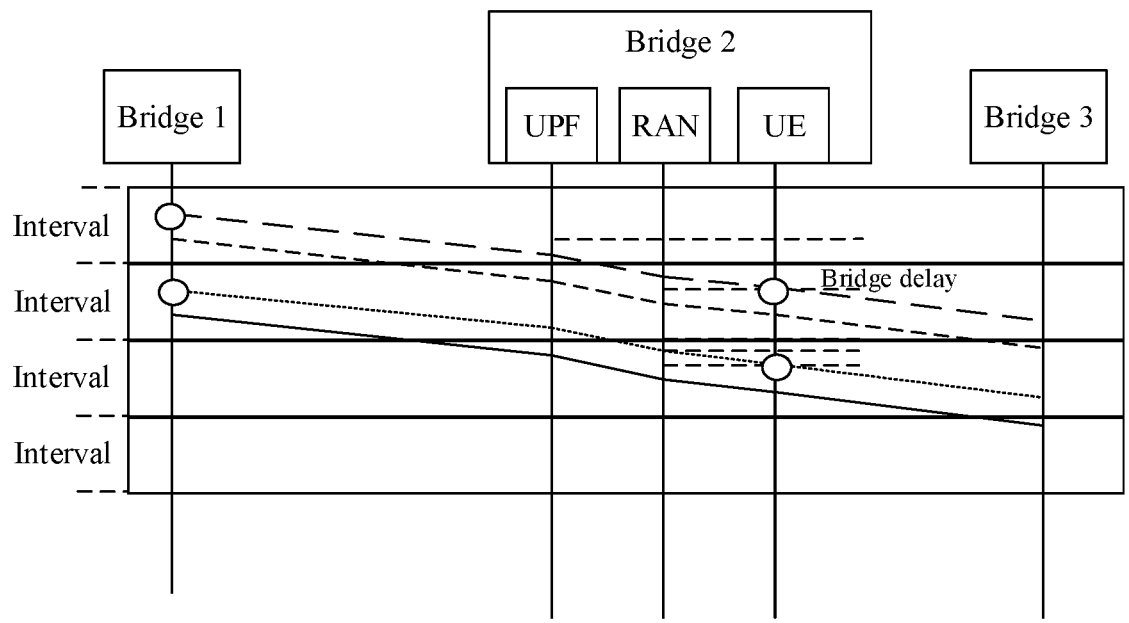

FIG. 3

```
┌──────────────────────────────────────────────────┐  ─ 41
│  Transmit first information and/or second information  │
└──────────────────────────────────────────────────┘
```

FIG. 4

```
┌────────────────────────────────────────────────────────┐  ─ 51
│  Obtain first information, second information, and/or third information  │
└────────────────────────────────────────────────────────┘
                            │
                            ▼
┌────────────────────────────────────────────────────────┐  ─ 52
│  Perform a first operation based on the first information, the second  │
│         information, and/or the third information         │
└────────────────────────────────────────────────────────┘
```

FIG. 5

METHOD FOR SUPPORTING TIME SENSITIVE COMMUNICATION AND COMMUNICATIONS DEVICE

CROSS-REFERENCE TO RELATED APPLICATIONS

This application is continuation application of PCT International Application No. PCT/CN2020/070878 filed on Jan. 8, 2020, which claims priority to Chinese Patent Application No. 201910028869.X, filed in China on Jan. 11, 2019, the disclosures of which are incorporated herein by reference in their entireties.

TECHNICAL FIELD

Embodiments of this disclosure relate to the field of wireless communications technologies, and in particular, to a method for supporting time-sensitive communication and a communications device.

BACKGROUND

Many vertical industries have demands for time-sensitive communication. In the industrial Internet, there are time-sensitive data, such as robot instructions, which need to be executed sequentially within a specified time. However, since network transmission resources are shared, and delays and jitters exist during data transmission, transmission of time-sensitive data cannot be supported. Therefore, time-sensitive networking is proposed to support the transmission of time-sensitive data.

In time-sensitive networking, time is divided into intervals (Interval), which are sliding windows. A traffic specification (traffic specification) for time-sensitive data streams is defined in each sliding window, to reserve transmission resources in advance. In this way, when the sliding window for data transmission arrives, even if there is no time-sensitive data stream, network resources cannot be occupied by other data streams. When a time-sensitive data stream arrives, dedicated resources are occupied for its transmission.

A transmitting end of the time-sensitive data stream is referred to as talker, and a receiving end of the time-sensitive data stream is referred to as listener. Data is forwarded through one or more bridges between the talker and the listener.

A transmission medium for the talker, the listener, or the bridge may be wireless connection. Therefore, a wireless communications network may be a transmission medium for time-sensitive networking. How to support time-sensitive communication in the wireless communications network is a technical problem to be urgently resolved.

SUMMARY

Embodiments of this disclosure provide a method for supporting time-sensitive communication and a communications device.

This disclosure is implemented as follows:

According to a first aspect, some embodiments of this disclosure provide a method for supporting time-sensitive communication, applied to a first communications device and including:

transmitting first information and/or second information; where
the first information includes at least one of the following:
first capability information of a terminal (UE) and information related to a delay between the UE and a radio access network (RAN) network element; and
the second information includes at least one of the following:
a type of the UE, a type of time-sensitive networking, and indication information of whether time-sensitive data stream configuration information is required.

According to a second aspect, some embodiments of this disclosure provide a method for supporting time-sensitive communication, applied to a second communications device and including:

obtaining first information, second information, and/or third information; and
performing a first operation based on the first information, the second information, and/or the third information; where
the first information includes at least one of the following:
first capability information of UE, and information related to a delay between the UE and a radio access network (RAN) network element;
the second information includes at least one of the following:
a type of the UE, a type of time-sensitive networking, and indication information of whether time-sensitive data stream configuration information is required; and
the third information includes at least one of the following:
capability information of an anchor gateway and first transmission configuration information of a time-sensitive data stream.

According to a third aspect, some embodiments of this disclosure provide a method for supporting time-sensitive communication, applied to a third communications device and including:

obtaining bridge configuration information and/or configuration information of a time-sensitive data stream; and
performing a second operation of time-sensitive communication based on the bridge configuration information and/or the configuration information of the time-sensitive data stream.

According to a fourth aspect, some embodiments of this disclosure provide a communications device, and the communications device is a first communications device, including:

a transmitting module, configured to transmit first information and/or second information; where
the first information includes at least one of the following:
first capability information of UE, and information related to a delay between the UE and a radio access network (RAN) network element; and
the second information includes at least one of the following:
a type of the UE, a type of time-sensitive networking, and indication information of whether time-sensitive data stream configuration information is required.

According to a fifth aspect, some embodiments of this disclosure provide a communications device, and the communications device is a second communications device, including:

an obtaining module, configured to obtain first information, second information, and/or third information; and an execution module, configured to perform a first operation based on the first information, the second information, and/or the third information; where the first information includes at least one of the following:

first capability information of UE, and information related to a delay between the UE and a radio access network (RAN) network element;

the second information includes at least one of the following:

a type of the UE, a type of time-sensitive networking, and indication information of whether time-sensitive data stream configuration information is required; and the third information includes at least one of the following:

capability information of an anchor gateway and first transmission configuration information of a time-sensitive data stream.

According to a sixth aspect, some embodiments of this disclosure provide a communications device, and the communications device is a third communications device, including:

an obtaining module, configured to obtain bridge configuration information and/or configuration information of a time-sensitive data stream; and an execution module, configured to perform a second operation of time-sensitive communication based on the bridge configuration information and/or the configuration information of the time-sensitive data stream.

According to a seventh aspect, some embodiments of this disclosure provide a communications device, including: a processor, a memory, and a program stored in the memory and capable of running on the processor, where when the program is executed by the processor, the steps of the method for supporting time-sensitive communication according to the first aspect are implemented, or the steps of the method for supporting time-sensitive communication according to the second aspect are implemented, or the steps of the method for supporting time-sensitive communication according to the third aspect are implemented.

According to an eighth aspect, some embodiments of this disclosure provide a computer-readable storage medium, where a computer program is stored in the computer-readable storage medium, and when the computer program is executed by a processor, the steps of the method for supporting time-sensitive communication according to the first aspect are implemented, or the steps of the method for supporting time-sensitive communication according to the second aspect are implemented, or the steps of the method for supporting time-sensitive communication according to the third aspect are implemented.

BRIEF DESCRIPTION OF DRAWINGS

Other advantages and benefits will become apparent to those of ordinary skill in the art by reading detailed description of the exemplary embodiments below. The accompanying drawings are merely intended to illustrate the purposes of the preferred implementations, and should not be construed as a limitation on this disclosure. Throughout the accompanying drawings, the same reference numerals represent the same components. In the accompanying drawings:

FIG. 3 is a schematic diagram of transmitting a time-sensitive data stream in a bridge;

FIG. 4 is a flowchart of a method for supporting time-sensitive communication according to some embodiments of this disclosure;

FIG. 5 is another flowchart of a method for supporting time-sensitive communication according to some embodiments of this disclosure;

DESCRIPTION OF EMBODIMENTS

Figure 1:
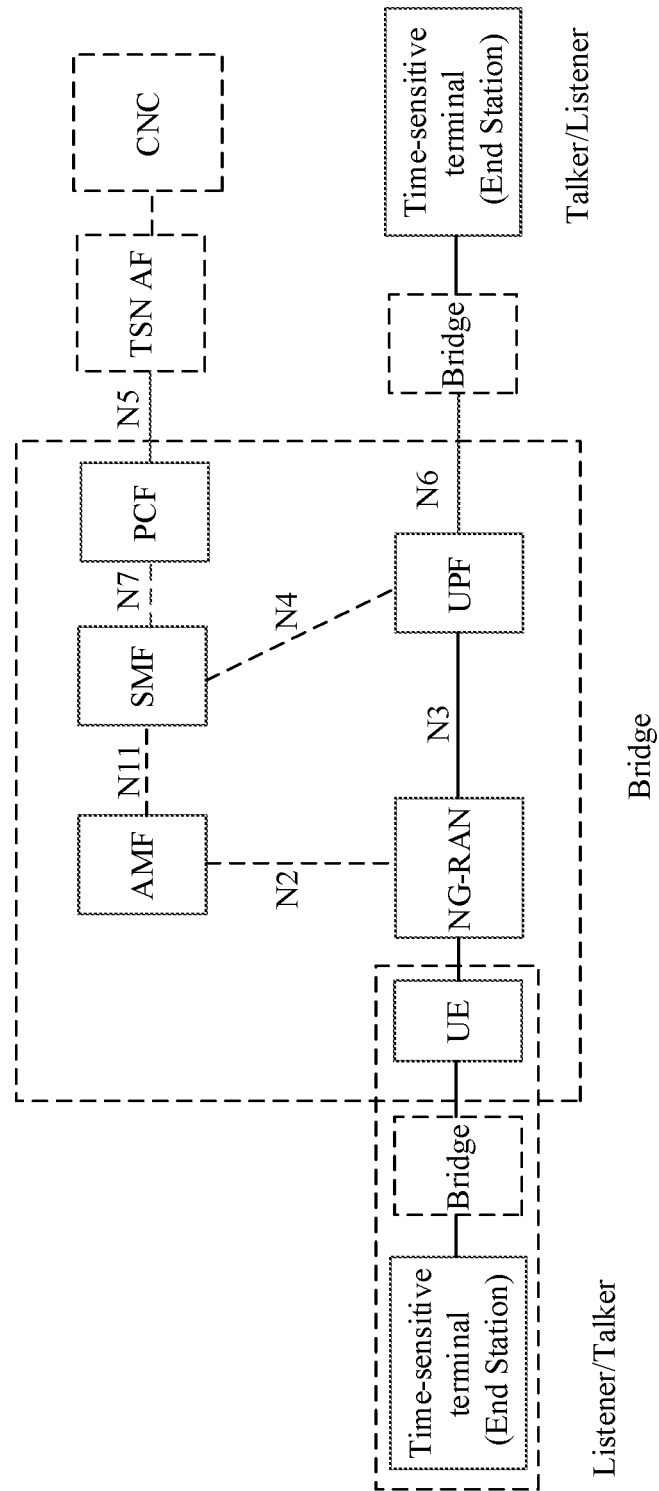
FIG. 1 is a schematic architectural diagram of a wireless communications system according to some embodiments of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The term "include" or any of its variants in the specification and claims of this application are intended to cover a non-exclusive inclusion, such that a process, a method, a system, a product, or a device that includes a series of steps or units not only includes those expressly listed steps or units but also includes other steps or units that are not expressly listed, or further includes elements inherent to such process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, the terms "an example" or "for example" are used to represent an example, an illustration, or a description. Any embodiment or design solution described as "an example" or "for example" in the embodiments of this disclosure should not be construed as preferred or advantageous over other embodiments or design solutions. To be precise, the use of terms such as "an example" or "for example" is intended to present a related concept in a specific manner.

The following describes the embodiments of this disclosure with reference to the accompanying drawings. A method for supporting time-sensitive communication and a communications device provided in the embodiments of this disclosure may be applied to a wireless communications system. The wireless communications system may be a 5G system, or an evolved long term evolution (eLTE for short) system, or a subsequent evolved communications system.

In some embodiments of this disclosure, time-sensitive may be also referred to as periodic deterministic (Periodic deterministic). Time-sensitive communication may be also referred to as periodic deterministic communication (Periodic deterministic communication). A time-sensitive data stream may be also referred to as a periodic deterministic data stream. An example of a time-sensitive networking technology is an IEEE TSN (Time Sensing Network). In periodic deterministic communication, data is transmitted periodically at transmission intervals.

In some embodiments of this disclosure, transmission configuration information of the time-sensitive data stream may include user and/or network configuration information. The user and/or network configuration information (User/Network Configuration Information) is used to configure transmission of the time-sensitive data stream. The user and/or network configuration information may be user and/or network configuration information specified in IEEE 802.1Qcc. The user and/or network configuration information may include at least one of the following: a listener group (listener group), a talker group (talker group), or a traffic specification (traffic specification).

Referring to FIG. 1, FIG. 1 is a schematic architectural diagram of a wireless communications system according to some embodiments of this disclosure.

A transmitting end of a time-sensitive data stream is referred to as talker, and a receiving end of the time-sensitive data stream is referred to as listener. Data is forwarded through one or more bridges between the talker and the listener. An end station (End Station) may be a talker or a listener. The bridge (Bridge) is responsible for data transmission between the talker and the listener.

UE and a wireless communications network form a bridge. For downlink data, the UE is an egress port of the bridge (Bridge), and a UPF is an ingress port of the bridge. For uplink data, the UE is an ingress port of the bridge, and the user plane function (UPF) is an egress port of the bridge.

The UE may be co-located with the end station, the UE may be co-located with the bridge, the UE may be connected to the bridge, or the UE may be connected to the end station.

The user and/or network configuration information (User/Network Configuration Information) is used to configure transmission of the time-sensitive data stream. For a centralized architecture, the wireless communications network may obtain the user and/or network configuration information through an external control unit that provides configuration information and an application function (AF). The external control unit that provides configuration information may be a centralized network configuration (CNC), which is not limited.

For a distributed architecture, the wireless communications network may receive user and/or network configuration information of a previous hop from the ingress port of the bridge, and then generate user and/or network configuration information of the local bridge.

Figure 2:
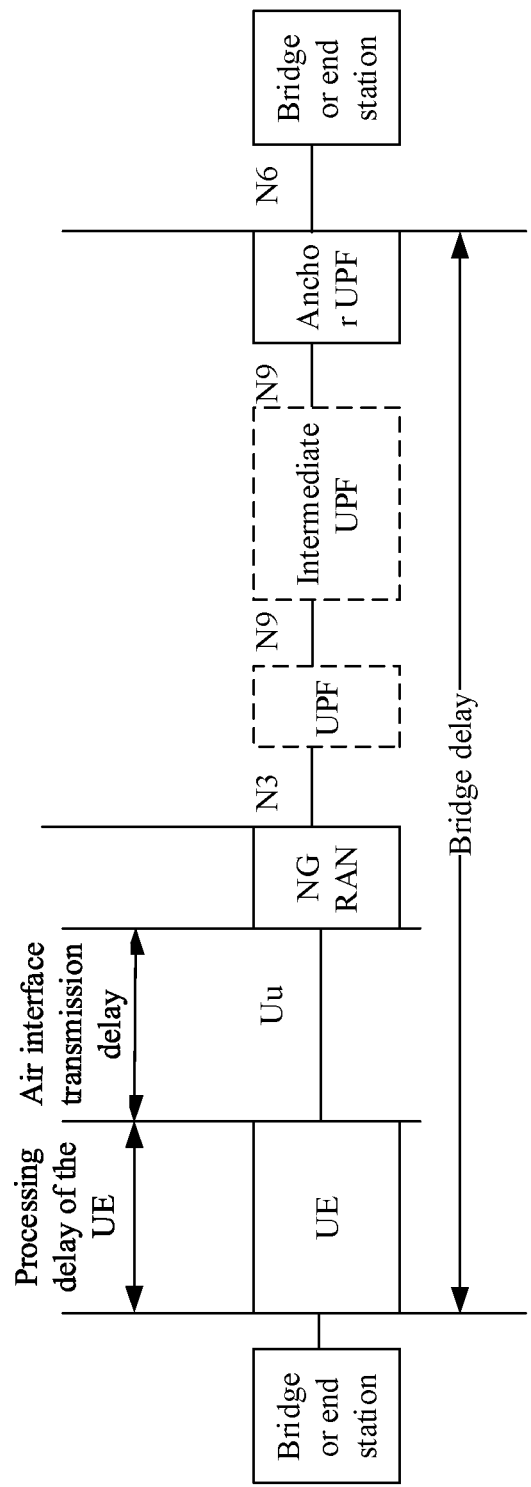
FIG. 2 is another schematic architectural diagram of a wireless communications system according to some embodiments of this disclosure.

Referring to FIG. 2, FIG. 2 is a schematic architectural diagram of another wireless communications system according to some embodiments of this disclosure.

As shown in FIG. 2, UE, a radio access network (RAN) network element, and a gateway UPF are included, where the UPF may be one or more UPFs. There may be no or a plurality of intermediate (Intermediate) UPFs between the RAN and an anchor UPF.

Referring to FIG. 3, FIG. 3 is a schematic diagram of transmitting a time-sensitive data stream in a bridge. In time-sensitive networking, time is divided into intervals (Interval) as sliding windows, and that between the foregoing two circles may represent a bridge delay (Bridge delay). In an embodiment of this disclosure, a bridge formed by the terminal and the wireless communications network may be simply referred to as a bridge formed by the terminal and the network. In an embodiment of this disclosure, the transmission interval may be referred to as a transmission period.

In order to support time-sensitive communication services, the following problems need to be resolved:

Question 1: When determining user and/or network configuration information, a CNC needs to consider the bridge delay. As shown in FIG. 2, the bridge delay includes a processing delay of UE, a delay between the UE and a RAN network element, and a delay between a RAN and a UPF.

(1) The processing delay of the UE is related to a capability of the UE. Different UEs have different capabilities, and one UE may support a plurality of bridge ports. The processing delay of the UE may be also referred to as a bridge delay of the UE acting as a bridge, or may be a time of data transmission between a bridge port and a Uu port. Therefore, the processing delay of the UE may also be different for different ports. Time-sensitive networking requires nanosecond-level delays, and the processing delay of the UE cannot be ignored. Therefore, how to know the processing delay of the UE by the network to determine the delay of the bridge formed by the UE and the wireless communications network is a problem that needs to be resolved.

(2) The delay between the UE and the RAN network element is part of an internal delay of the bridge. Different distances between the UE and a cell center indicate different air interface transmission delays. Therefore, the delay of the bridge formed by the UE and the wireless communications network is not fixed. How to know the delay between the UE and the RAN network element (which may include the air interface transmission delay) is a problem that needs to be resolved.

(3) An end-to-end delay between the RAN network element and the anchor gateway (such as the anchor UPF) is also part of the bridge delay. As the UE is handed over between RAN network elements. The delay between the RAN network element and the anchor UPF also varies. How to know the delay between the RAN network element and the anchor UPF is a problem that needs to be resolved.

Question 2: When the UE acts as a bridge egress port, a transmission medium connection capability of the UE is different due to different UE capabilities. Therefore, an available bandwidth (or referred to as a transmission rate) supported by the UE is different. That is, the UE acting as the bridge has different propagation delays.

Data packets of the same size require different transmission times in different bandwidths. For time-sensitive networking, a time period between a latest start transmission time and a data transmission end time needs to be long enough to transmit the last data packet within a transmission interval. The data transmission intervals have the same end time, and therefore the latest start transmission time is different for different bandwidths.

For the centralized bridge architecture, the CNC needs to obtain a capability (such as an available bandwidth) of the bridge to configure the user and/or network configuration information. For the distributed bridge architecture, the bridge formed by the UE and the network obtains user and/or network configuration information of the previous hop after receiving an SRP message, and also needs to configure user and/or network configuration information of the next hop based on a capability of the bridge. However, the wireless communications network still lacks information about the capability of the UE acting as the bridge egress port.

Question 3: In time-sensitive networking, transmission of time-sensitive data streams is configured for the bridge and/or the end station, which is generally referred to as user and/or network configuration information. Configuration architectures for time-sensitive networking include three types: fully distributed, fully centralized, and centralized-distributed hybrid. The bridge may obtain the user and/or network configuration information from the CNC. For the centralized-distributed hybrid, a bridge connected to an end station needs to transmit the user and/or network configuration information to the end station. A bridge connected to another bridge does not need to transmit the user and/or network configuration information to the connected bridge. For the centralized type, a bridge connected to an end station does not need to transmit the user and/or network configuration information to the end station. The UE and the wireless communications network form a bridge, and the UE may be co-located with the end station, that is, the UE may be an end station or may be a bridge. However, the wireless communications network still lacks information about whether the UE acts as an end station or a bridge and also lacks information about a type of time-sensitive networking, and therefore cannot determine whether to transmit the transmission configuration information of the time-sensitive data stream to the UE.

Optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in some embodiments of this disclosure. For example, when specific capability indication information transmitted by a device is not received, it can be deduced that the device does not support the capability.

Optionally, transmitting may include broadcasting, broadcasting through a system message, or returning a response after receiving the request.

In an optional embodiment of this disclosure, a tunnel may include at least one of the following: a PDU session, a quality of service (QoS) flow, an evolved packet system (EPS) bearer, a PDP context, a DRB, an SRB, or an Internet Protocol Security (IPsec) association.

In an embodiment of this disclosure, an NG interface may be also referred to as an S1 interface or an N2 interface, and the naming is not limited.

In an embodiment of this disclosure, the wireless communications network may be at least one of the following: a public network or a non-public network. For example, a first network may be a non-public network.

In an embodiment of this disclosure, the non-public network is an abbreviation of the non-public network. The non-public network may be referred to as one of the following: a non-public communications network. The non-public network may include at least one of the following deployment manners: a physical non-public network, a virtual non-public network, or a non-public network implemented on a public network. In an implementation, the non-public network is a closed access group (CAG). A CAG may include a group of terminals.

In an embodiment of this disclosure, the non-public network may include or be referred to as a private network. The private network may be referred to as one of the following: a private communications network, a private network, a local area network (LAN), a private virtual network (PVN), an isolated communications network, a dedicated communications network, or other names. It should be noted that the naming manner is not specifically limited in some embodiments of this disclosure.

In an embodiment of this disclosure, the public network is an abbreviation of the public network. The public network may be referred to as one of the following: a public communications network or other names. It should be noted that the naming manner is not specifically limited in some embodiments of this disclosure.

In an embodiment of this disclosure, a data packet size may be referred to as a data packet length.

In an embodiment of this disclosure, a data packet may be referred to as a data frame.

In an optional embodiment of this disclosure, the communications device may include at least one of the following: a communications network element or a terminal.

In an embodiment of this disclosure, the communications network element may include at least one of the following: a core network network element or a radio access network network element.

In some embodiments of this disclosure, the core network element (CN network element) may include but is not limited to at least one of the following: a core network device, a core network node, a core network function, a core network network element, a mobility management entity (MME), an access mobility management function (AMF), a session management function (SMF), a user plane function (UPF), a serving gateway (serving GW, SGW), a PDN gateway (PDN Gate Way), a policy control function (PCF), a policy and charging rules function (PCRF), a serving GPRS support node (SGSN), a gateway GPRS support node (GGSN), or a radio access network device.

In some embodiments of this disclosure, the RAN network element may include but is not limited to at least one of the following: a radio access network device, a radio access network node, a radio access network function, a radio access network network element, a 3GPP radio access network, a non-3GPP radio access network, a centralized unit (CU), a distributed unit (DU), a base station, an evolved NodeB (evolved Node B, eNB), a 5G NodeB (gNB), a radio network controller (RNC), a NodeB (NodeB), a non-3GPP interworking function (N3IWF), an access controller (AC) node, an access point (AP) device, a wireless local area network (WLAN) node, or an N3IWF.

The base station may be a base transceiver station (BTS) in GSM or CDMA, or may be a NodeB (NodeB) in WCDMA, or may be an evolved NodeB (eNB or e-Node B) in LTE, or a 5G NodeB (gNB), which is not limited in some embodiments of this disclosure.

In some embodiments of this disclosure, the UE is a terminal. The terminal may include a relay supporting terminal functions and/or a terminal supporting relay functions. The terminal may be also referred to as a terminal device or user equipment (UE). The terminal may be a terminal-side device such as a mobile phone, a tablet computer (Tablet Personal Computer), a laptop computer (Laptop Computer), a personal digital assistant (PDA), a mobile Internet device (MID), a wearable device (Wearable Device), or a vehicle-mounted device. It should be noted that a specific type of the terminal is not limited in some embodiments of this disclosure.

The following describes the method for supporting time-sensitive communication in some embodiments of this disclosure.

Referring to FIG. 4, some embodiments of this disclosure provide a method for supporting time-sensitive communication, applied to a first communications device. The first communications device includes but is not limited to UE, and the method includes the following steps.

Step 41: Transmit first information and/or second information, where the first information includes at least one of the following: first capability information of the UE and information related to a delay between the UE or a RAN network element; and the second information includes at least one of the following: a type of the UE, a type of time-sensitive networking, or indication information of whether time-sensitive data stream configuration information is required.

(1) The first capability information of the UE may be understood as a capability of the UE acting as a bridge. The first capability information of the UE may include at least one of the following: bridge identification information of the UE, information about a bandwidth supported by the UE, processing delay information of the UE, or transmission propagation delay related information of the UE. The information about the bandwidth supported by the UE may include information related to an available bandwidth supported by the UE, and indication information of whether time-sensitive communication is supported. The indication information of whether time-sensitive communication is supported may include whether a stream reservation protocol (SRP) is supported.

It should be noted that the first capability information includes the bridge identification information of the UE, the information about the bandwidth supported by the UE, the processing delay information of the UE, and the transmission propagation delay related information of the UE, so that the network side can determine a specific capability of the terminal based on the capability information and then perform configuration based on the capability of the terminal, to configure transmission with more accurate time.

(1.1) Optionally, the information about the bandwidth supported by the UE includes at least one of the following: information related to a port, a bandwidth of the port, a bandwidth availability parameter of the port, or a transmission rate of the port.

In an implementation, the bandwidth availability parameter of the port may be defined in the IEEE 802.1Q series, for example, a bandwidth availability parameter (Bandwidth Availability Parameters).

In an implementation, the bandwidth of the port may be an available bandwidth of the port, and the transmission rate of the port may be an available transmission rate of the port.

(1.2) Optionally, the transmission propagation delay related information of the UE includes at least one of the following: information related to a port, a transmission propagation delay of the port, or a traffic class (traffic class).

The transmission propagation delay of the port may be a time required for transferring a data frame from the port of the UE to a port of a connected station (a bridge or an end station).

(1.3) Optionally, the information related to a port may include at least one of the following: identification information of the port, information related to a direction of the port being an egress or an ingress, a port number, a MAC address of the port, an IP address of the port, VLAN tag information associated with the port, or data filter information of the port.

Optionally, the data filter information of the port may include at least one of the following: virtual local area network (VLAN) tag information, a media access control (MAC) address, an IPv4 address, a port number, an IPv6 address, or indication information of the port, where the indication information of the port includes indication information of a transmitting port or the indication information of a receiving port.

The VLAN tag information may include: a service VLAN tag (S-TAG) and/or a customer VLAN tag (C-TAG).

(1.4) Optionally, the traffic class is a quantity of transmission queues or a traffic type of the port. The traffic type may include at least one of the following: background (Background), best-effort (best effort), excellent effort (excellent effort), critical applications (critical application), video (video), voice (voice), Internetwork control (Internetwork control), or network control (Network control).

(1.5) Optionally, the processing delay information of the UE includes at least one of the following: information related to a data ingress port, information related to a data egress port, the processing delay of the UE, or a traffic class associated with a data packet. The information related to a port is described above, and details are not repeated herein. The traffic class is described above, and details are not repeated herein.

Optionally, the processing delay of the UE may be a bridge delay of the UE acting as a bridge. In an implementation, the processing delay of the UE may be a time required for transmitting a data packet from a data ingress port to a data egress port. The data ingress port or the data egress port may include one of the following: a UU port of the UE and a bridge port of the UE; where the UU interface is an interface between the UE and a RAN. The data ingress port or the data egress port may also include one of the following: a first bridge port of the UE and a second bridge port of the UE.

In an implementation, the first bridge port of the UE may be a bridge port connected to the UU interface of the UE. In an implementation, the second bridge port of the UE may be a port connected to a bridge or an end station.

For example, when the data ingress port is the UU interface of the UE, the data egress port may be the bridge port of the UE or the bridge egress port of the UE; or when the data ingress port is the bridge port of the UE or the bridge ingress port of the UE, the data egress port may be the UU interface of the UE; or when the data ingress port is the first bridge port and the data egress port is the second bridge port of the UE; or when the data ingress port is the second bridge port of the UE, and the data egress port is the first bridge port of the UE.

Further, the processing delay of the UE may be at least one of the following:

a time required for transferring a data packet from the first bridge port of the UE to the second bridge port of the UE;

a time required for transferring a data packet from the second bridge port of the UE to the first bridge port of the UE;

a time required for transferring a data packet from the UU interface of the UE to the bridge port of the UE;

a time required for a data packet to pass from the bridge port of the UE to the UU interface of the UE; or a time required from receiving a data packet at the bridge port of the UE until preparing to transmit the data packet at the UU interface of the UE.

In an implementation, the time required for transferring a data packet from the first bridge port of the UE to the second bridge port of the UE is the same as the time required for transferring a data packet from the second bridge port of the UE to the first bridge port of the UE.

Further, the processing delay of the UE may include at least one of the following: a maximum processing delay of the UE or a minimum processing delay of the UE. The minimum processing delay of the UE is also referred to as a minimum bridge delay of the UE, and the maximum processing delay of the UE is also referred to as a maximum bridge delay of the UE. The minimum processing delay of the UE may be further divided into a minimum processing delay, related to a data packet size, of the UE and a minimum processing delay, unrelated to a data packet size, of the UE. The maximum processing delay of the UE may be further divided into a maximum processing delay, related to a data packet size, of the UE and a maximum processing delay, unrelated to a data packet size, of the UE.

Further, the processing delay of the UE may include at least one of the following: a downlink processing delay of the UE or an uplink processing delay of the UE.

The downlink processing delay of the UE may include one of the following:

a time required for a data packet to pass from the first bridge port of the UE to the second bridge port of the UE; and a time required for a data packet to pass from the UU interface of the UE to the bridge port of the UE.

The downlink processing delay of the UE may be referred to as a downlink delay of the UE acting as a bridge.

The uplink processing delay of the UE may include one of the following:

a time required for transferring a data packet from the second bridge port of the UE to the first bridge port of the UE;

a time required for a data packet to pass from the bridge port of the UE to the UU interface of the UE; and a time from receiving a data packet at the bridge port of the UE until preparing to transmit the data packet at the UU interface of the UE.

It is easy to understand that uplink data transmission requires the UE to request the RAN for scheduling. A delay for waiting for scheduling of the RAN network element does not belong to the processing delay of the UE. The uplink processing delay of the UE may be referred to as an uplink delay of the UE acting as a bridge.

In an implementation, the uplink processing delay of the UE is consistent with the downlink processing delay of the UE.

(2) Information about the delay between the UE and the RAN network element includes at least one of the following: an end-to-end delay between the UE and the RAN network element, an air interface transmission delay between the UE and the RAN network element, a processing delay of the RAN, or the processing delay of the UE. The RAN network element may be a serving RAN network element of the UE, a RAN network element that stores a UE context, or a RAN network element currently accessed by the UE.

Optionally, the end-to-end delay between the UE and the RAN network element may include at least one of the following:

a time required from receiving a data packet at an N3 interface by the RAN network element until receiving the data packet by the UE;

a time required from transmitting a data packet by the UE to the RAN network element until transmitting the data packet by the RAN network element to the N3 interface;

a sum of the air interface transmission delay between the UE and the RAN network element and the processing delay of the RAN; or a sum of the air interface transmission delay between the UE and the RAN network element, the processing delay of the RAN, and the processing delay of the UE.

The N3 interface is an N3 interface shown in FIG. 1 or FIG. 2.

Optionally, the processing delay of the RAN is the time required from receiving a data packet by the RAN network element until transmitting the data packet by the RAN network element to the UE.

In an implementation, the air interface transmission delay between the UE and the RAN network element is a timing advance/2. The timing advance may be a transmission advance time that is configured by the RAN network element for the UE based on the air interface transmission delay. The timing advance is, for example, N*TA (TA is a smallest unit for time adjustment). A larger relative distance between the UE and the base station or the cell center indicates a larger air interface transmission delay. In another implementation, the air interface transmission delay is a time value obtained through calculation based on a cell radius. In another implementation, the air interface transmission delay between the UE and the RAN network element is harq/2, where harq/2 is a time required for a ½ HARQ process.

(1) The type of the UE includes one of the following: bridge and end station.

(2) The type (or referred to as architecture type) of time-sensitive networking includes one of the following: fully distributed, fully centralized, and centralized-distributed hybrid.

In an implementation, the UE is a bridge. The network needs to transmit user and/or network configuration information to the UE.

In another implementation, when the UE is an end station and the architecture type of time-sensitive networking is fully distributed or centralized-distributed hybrid, the network needs to transmit user and/or network configuration information to the UE.

In another implementation, when the UE is an end station and the architecture type of time-sensitive networking is fully centralized, the network does not need to transmit user and/or network configuration information to the UE.

(3) Indication information of whether the configuration information of the time-sensitive data stream is required. When the indication information indicates yes, the network needs to transmit the user and/or network configuration information to the UE. When the indication information indicates no or the indication information is not included, the network does not need to transmit the user and/or network configuration information to the UE.

Further, step 401 may be transmitting the first information and/or the second information when a preset condition is satisfied.

The preset condition may be at least one of the following:

a request for the first information is received from the network;

a request for the second information is received from the network;

the type of the UE is bridge; or the UE supports time-sensitive communication.

In this way, the first information and/or the second information can be transmitted only when the preset condition is satisfied, so as to avoid frequent transmission of the first information and/or the second information, and reduce power consumption.

In an implementation, when the UE supports time-sensitive communication, the first information and/or the second information are transmitted and the indication information of whether the time-sensitive communication is supported indicates that the time-sensitive communication is supported.

Optionally, after the step of transmitting the first information and/or the second information, the method further includes:

obtaining port configuration information, where the port configuration information includes at least one of the following: information related to a port, a bandwidth of the port, or a transmission rate of the port; and configuring the bandwidth and/or transmission rate of the port based on the port configuration information that is obtained.

The port configuration information may be transmitted by the network.

In this implementation, the bandwidth and/or transmission rate of the port is configured based on the port configuration information that is obtained, so that the configured port bandwidth is more suitable for transmission of time-sensitive data.

Optionally, the transmitting the first information and/or the second information includes:

transmitting the first information and/or the second information to a target end, where the target end includes: a RAN network element and a CN network element. The target end may be a communications network element that forms a bridge with the UE in the network.

The CN network element may include, but is not limited to, at least one of the following: a PCF, an AMF, or an SMF.

In some embodiments of this disclosure, the first communications device can provide the network with the related capability and delay related information that are of the UE acting as the bridge, and support the network to determine the capability of the bridge formed by the UE and the network. In addition, the UE can transmit time-sensitive networking information of the UE to the network, and support the network to determine whether to configure the time-sensitive data stream for the UE, so as to support time-sensitive communication.

Referring to FIG. 5, some embodiments of this disclosure further provide a method for supporting time-sensitive communication, applied to a second communications device. The second communications device includes, but is not limited to, a CN network element and a PCF. The method includes the following steps.

Step 51: Obtain first information, second information, and/or third information.

Step 52: Perform a first operation based on the first information, the second information, and/or the third information.

The first information is the first information in the embodiment shown in FIG. 4, and details are not repeated herein.

The second information is the second information in the embodiment shown in FIG. 4, and details are not repeated herein.

The third information includes at least one of the following: capability information of an anchor gateway or first transmission configuration information of a time-sensitive data stream (such as user and/or network configuration information).

Optionally, the first information may be obtained from at least one of the following: UE, a first communications device, or a RAN network element currently accessed by the UE.

Optionally, the second information may be obtained from at least one of the following: the UE, the first communications device, or the RAN network element currently accessed by the UE.

Optionally, the third information may be obtained from at least one of the following: the UE or an anchor gateway.

Optionally, information related to the anchor gateway includes at least one of the following: the capability information of the anchor gateway, information related to a delay between a RAN network element and the anchor gateway, or processing delay information of the anchor gateway.

(1) The capability of the anchor gateway may be understood as a capability of the anchor gateway acting as a bridge. The capability information of the anchor gateway may include at least one of the following: bridge identification information of the anchor gateway, information about a bandwidth supported by the anchor gateway, a processing delay of the anchor gateway, or transmission propagation delay related information of the anchor gateway.

Optionally, the information about the bandwidth supported by the anchor gateway includes at least one of the following: information related to a port, a bandwidth of the port, or a transmission rate of the port.

The bandwidth of the port may be an available bandwidth of the port, and the transmission rate of the port may be an available transmission rate of the port.

Optionally, the transmission propagation delay related information of the anchor gateway includes at least one of the following: information related to a port, a transmission propagation delay of the port, or a traffic class.

The transmission propagation delay of the port may be a time required for transferring a data frame from a port of the UE to a port of a connected station (for example, a bridge or an end station).

Optionally, the information related to a port may include at least one of the following: identification information of the port, information related to a direction of the port being an egress or an ingress, a port number, a MAC address of the port, an IP address of the port, VLAN tag information associated with the port, or data filter information of the port.

Optionally, the data filter information of the port may include at least one of the following: VLAN tag information (including an S-Tag and/or a C-Tag), a MAC address, an IPv4 address, a port number, an IPv6 address, indication information of a transmitting port, or indication information of a receiving port.

Optionally, for the traffic class, refer to the corresponding description of the example shown in FIG. 4. Details are not repeated herein.

(2) The information related to the delay between the RAN network element and the anchor gateway includes at least one of the following: a delay between the RAN network element and a connected gateway, a delay between N gateways, or the processing delay of the anchor gateway, where each inter-gateway delay is a delay between two gateways, and N is an integer greater than 1.

(3) Optionally, the processing delay information of the anchor gateway includes at least one of the following: information related to a data ingress port, information related to a data egress port, the processing delay of the anchor gateway, or a traffic class associated with a data packet.

In an implementation, the processing delay of the anchor gateway may be a time required for transmitting a data packet from the data ingress port to the data egress port. The data ingress port or the data egress port may include: an N3 interface or N9 interface, and an N6 interface.

Further, the processing delay of the anchor gateway may include at least one of the following: a maximum processing delay of the anchor gateway or a minimum processing delay of the anchor gateway. The minimum processing delay of the anchor gateway is also referred to as a minimum bridge delay of the anchor gateway, and the maximum processing delay of the anchor gateway is also referred to as a maximum bridge delay of the anchor gateway. The minimum processing delay of the anchor gateway may be further divided into a minimum processing delay, related to a data packet size, of the anchor gateway and a minimum processing delay, unrelated to a data packet size, of the anchor gateway. The maximum processing delay of the anchor gateway may be further divided into a maximum processing delay, related to a data packet size, of the anchor gateway and a maximum processing delay, unrelated to a data packet size, of the anchor gateway.

Further, the processing delay of the anchor gateway may include at least one of the following: a downlink processing delay of the anchor gateway or an uplink processing delay of the anchor gateway.

The downlink processing delay of the anchor gateway may be a time required from receiving a data packet at the N3 or N9 interface of the anchor gateway until transmitting the same data packet at the bridge egress port of the anchor gateway.

The anchor gateway is a gateway that terminates the N6 interface. Further, the anchor gateway may be an anchor gateway that establishes a bridge tunnel.

The RAN network element is a RAN network element serving the UE.

Optionally, the first operation may be a time-sensitive related operation. For example, the first operation may include at least one of the following:

(1) determining a capability of a bridge formed by the UE and a network;

(2) determining second transmission configuration information of the time-sensitive data stream (such as user and/or network configuration information for the egress port);

(3) transmitting configuration information of the time-sensitive data stream, where the configuration information of the time-sensitive data stream is the first transmission configuration information of the time-sensitive data stream or the second transmission configuration information of the time-sensitive data stream;

(4) determining bridge configuration information; or (5) disclosing or transmitting the capability of the bridge formed by the UE and the network.

The determining, based on the first information, the second information, and/or the third information, an internal delay of a bridge formed by the UE and the network includes at least one of the following:

determining the internal delay of the bridge formed by the UE and the network; or determining a bandwidth availability parameter of the bridge formed by the UE and the network.

In an implementation, the internal delay of the bridge formed by the UE and the network may be determined as one of the following:

a sum of the processing delay of the UE, the delay between the UE and the RAN network element, and the delay between the RAN network element and the anchor gateway (that is, the processing delay of the UE+the delay between the UE and the RAN network element+the delay between RAN network element and the anchor gateway);

a sum of the processing delay of the UE, the transmission delay between the UE and the RAN network element, a processing delay of the RAN network element, the delay between the RAN network element and the anchor gateway, and the processing delay of the anchor gateway (that is, the processing delay of the UE+the transmission delay between the UE and the RAN network element+the processing delay of the RAN network element+the delay between the RAN network element and the anchor gateway+the processing delay of the anchor gateway).

The second transmission configuration information of the time-sensitive data stream is determined based on the first information, the second information, and/or the third information.

A data start transmission offset may be a data start transmission time within a data transmission interval (interval) at the egress port.

In an implementation, the data start transmission offset may be (the bridge delay+a data arrival time at the ingress port) mod the data transmission interval. When a calculated data start transmission offset and an end time of the interval are not long enough to transmit a maximum transmission frame and a maximum transmission quantity, transmission may be postponed to a start time of the next interval. That is, the data start transmission offset may be zero.

The data start transmission offset is further divided into an earliest data start transmission offset and a latest data start transmission offset.

The transmitting configuration information of the time-sensitive data stream based on the first information, the second information, and/or the third information may include at least one of the following:

when a first condition is satisfied, transmitting the configuration information of the time-sensitive data stream to the UE; or when a second condition is satisfied, transmitting the configuration information of the time-sensitive data stream to the anchor gateway.

Optionally, the first condition includes at least one of the following:

The time-sensitive data stream is downlink data (for example, when the UE is an egress port of the bridge formed by the UE and the network);

the type of the UE is bridge;

the architecture type of time-sensitive networking is fully distributed;

the UE is an end station and the architecture type of time-sensitive networking is centralized-distributed hybrid; or indication information for the configuration information of the time-sensitive data stream indicates that the configuration information of the time-sensitive data stream is required.

Optionally, the second condition includes at least one of the following:

the time-sensitive data stream is uplink data (for example, the port of bridge formed by the UE and the network is the egress port); or the architecture type of time-sensitive networking is fully distributed or centralized-distributed hybrid.

Optionally, after the step of performing the first operation, the method further includes:

transmitting the determined bridge configuration information to at least one of the following:

the UE or the anchor gateway.

The bridge configuration information is configuration information of the bridge egress port.

Optionally, the bridge configuration information includes at least one of the following: information related to a port or a configured bandwidth of the port.

In an implementation, when the time-sensitive data stream is downlink data or when the UE is the bridge egress port, the bridge configuration information is transmitted to the UE. In another implementation, when the time-sensitive data stream is uplink data or when the anchor gateway is the bridge egress port, the bridge configuration information is transmitted to the anchor gateway.

According to some embodiments of this disclosure, based on the related capability of the UE acting as a bridge, the related capability of the anchor gateway acting as a bridge, and delay-related information, the second communications device determines the capability of the bridge formed by the UE and the network, and performs operations such as a configuration of the bridge egress port; and based on the time-sensitive networking information of the UE, determines whether to configure the time-sensitive data stream for the UE, so as to support time-sensitive communication.

Figure 6:
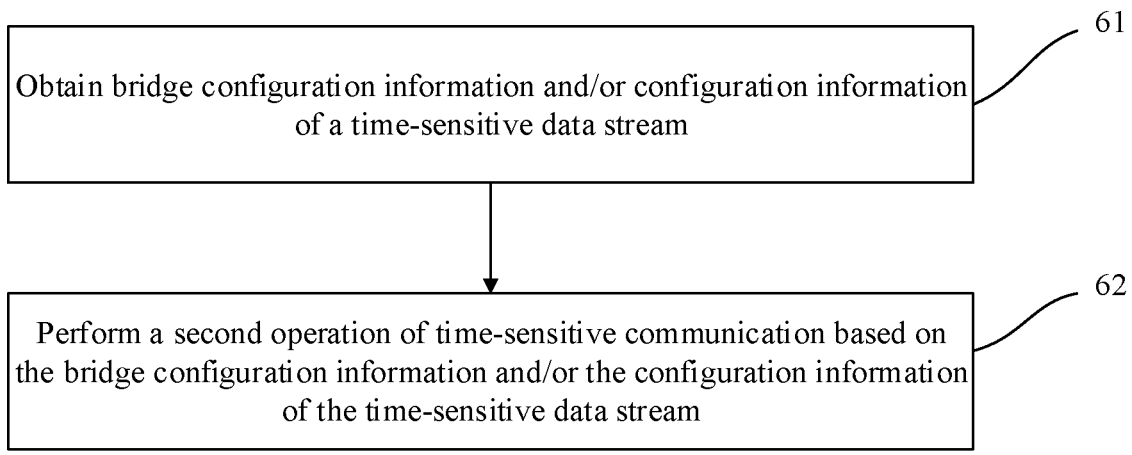
FIG. 6 is another flowchart of a method for supporting time-sensitive communication according to some embodiments of this disclosure.

Referring to FIG. 6, this disclosure further provides a method for supporting time-sensitive communication, applied to a third communications device. The third communications device includes, but is not limited to, UE or an anchor UPF. The method includes the following steps.

Step 61: Obtain bridge configuration information and/or configuration information of a time-sensitive data stream.

Step 62: Perform a second operation of time-sensitive communication based on the bridge configuration information and/or the configuration information of the time-sensitive data stream.

The bridge configuration information may be configuration information of a network egress port.

Optionally, the bridge configuration information includes at least one of the following: information related to a port, a bandwidth of the port, or a transmission rate of the port.

The bandwidth of the port may be an available bandwidth of the port, and the transmission rate of the port may be an available transmission rate of the port.

The information related to a port is described in the embodiment in FIG. 4, and details are not repeated herein.

In an implementation, the performing the second operation related to time-sensitive communication based on the bridge configuration information and/or the configuration information of the time-sensitive data stream includes: configuring the bandwidth and/or transmission rate of the port based on obtained port configuration information.

In some embodiments of this disclosure, the bridge egress port is configured to support time-sensitive communication.

Figure 7:
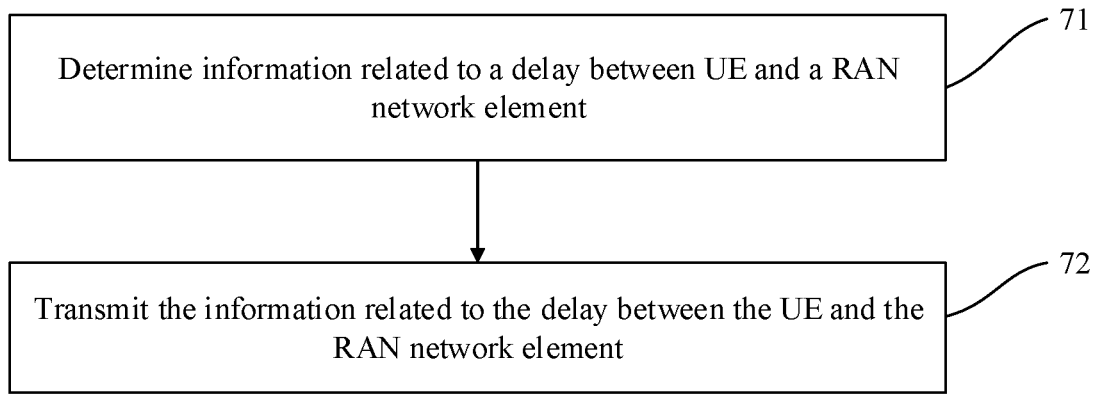
FIG. 7 is another flowchart of a method for supporting time-sensitive communication according to some embodiments of this disclosure.

Referring to FIG. 7, some embodiments of this disclosure further provide a method for supporting time-sensitive communication, applied to a fourth communications device. The fourth communications device includes, but is not limited to, a RAN network element. The method includes the following steps.

Step 71: Determine information related to a delay between UE and the RAN network element.

Step 72: Transmit the information related to the delay between the UE and the RAN network element.

Specifically, the information related to the delay between the UE and the RAN network element is defined as the information related to the delay between the UE and the RAN network element in the embodiment of FIG. 4, and details are not repeated herein.

Optionally, the information related to the delay between the UE and the RAN network element is transmitted to at least one of the following: an AMF, an SMF, or a PCF. In an implementation, after the information related to the delay between the UE and the RAN network element is transmitted to the AMF, the AMF transmits the information related to the delay between the UE and the RAN network element to the PCF.

In some embodiments of this disclosure, the fourth communications device provides delay related information, and supports the network to determine a capability of a bridge formed by the UE and the network, so as to support time-sensitive communication.

The following describes the method for supporting time-sensitive communication in some embodiments of this disclosure with reference to specific application scenarios.

Figure 8:
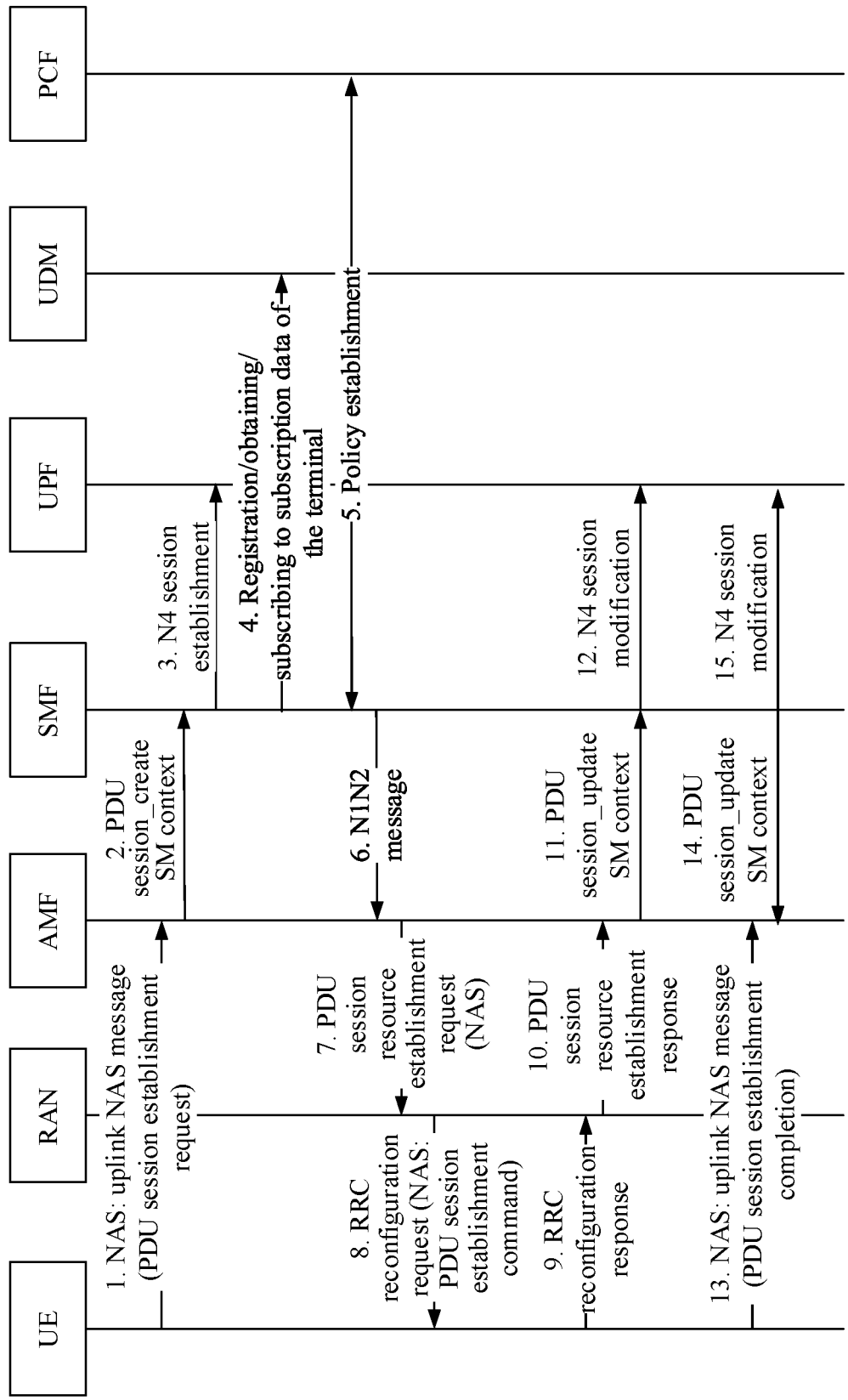
FIG. 8 is another schematic diagram of a method for supporting time-sensitive communication according to some embodiments of this disclosure.

Application scenario 1 in this embodiment of this disclosure:

The application scenario 1 in this embodiment of this disclosure mainly describes a process in which UE requests establishment of a PDU (protocol data unit) session. The PDU session may be used by the UE acting as a bridge to perform communication within a local area network (such as a VLAN). Referring to FIG. 8, the following steps are included:

Step 1: The UE transmits first information and/or second information (as described in the embodiment of FIG. 4) to an AMF, for example, indicating a capability of the UE acting as a bridge (such as a processing delay of the UE and a bandwidth of a port), a delay between the UE and a RAN network element delay, a type of the UE, or the like.

The UE transmits an uplink NAS message to the AMF, where the NAS message includes a PDU session establishment request. The PDU session establishment request includes the first information and/or the second information (as described in the embodiment of FIG. 4).

Step 2: The AMF transmits a PDU session_create SM context message to an SMF.

Step 3: The SMF selects a UPF, and the SMF transmits an N4 session establishment to the selected UPF.

Step 4: The SMF registers the terminal to a unified data management (UDM). The SMF may also obtain and subscribe to subscription data of the terminal.

Step 5: The SMF obtains a policy of the terminal from a PCF.

The SMF transmits the obtained first information and/or second information to the PCF. The PCF performs a first operation (as described in the embodiment of FIG. 6) related to time sensitivity based on the first information and/or the second information, for example, determining a capability (such as a bridge delay) of a bridge formed by the UE and the network. The PCF transmits the capability of the bridge to an AF, and the AF transmits the capability of the bridge to a CNC.

Step 6: The SMF transmits an N1N2 message to the AMF, where the N1N2 message includes a NAS message for PDU session establishment accept.

Step 7: The AMF transmits a PDU session resource establishment request message to a RAN network element, where the request message includes a NAS message for PDU session establishment.

Further, for the second information, refer to the description in the embodiment shown in FIG. 4. Details are not repeated herein.

Step 8: The RAN network element transmits an RRC reconfiguration request to the UE, where the request is a NAS message, including a PDU session establishment command.

Step 9: The UE returns an RRC reconfiguration response to the RAN network element.

Step 10: The RAN network element returns a PDU session resource establishment response to the AMF.

Step 11: The AMF transmits an SM context update request to the SMF.

Step 12: The SMF transmits, to the UPF, an N4 session update, which is also referred to as an N4 session modification.

Step 13: The UE transmits an uplink NAS message to the AMF, where the message indicates completion of PDU session establishment.

Step 14: The SMF transmits an SM context update response to the AMF.

Step 15: The SMF transmits, to the UPF, an N4 session update, which is also referred to as an N4 session modification.

In some embodiments of this disclosure, during the PDU session establishment related to the bridge, the UE provides the first information to the network. The network may determine, based on the first information, the capability of the bridge formed by the UE and the network, and disclose the capability of the bridge to an external device (such as a CNC). The CNC may determine, based on the capability of the bridge, user and/or network configuration information of the bridge formed by the UE and the network, so as to support implementation of time-sensitive networking.

In the application scenario 1, during the PDU session establishment related to the bridge, the UE provides the first information and/or the second information to the network. The network may determine, based on the first information and/or the second information, the capability of the bridge formed by the UE and the network, and disclose the capability of the bridge to an external device (such as the CNC). The CNC may determine, based on the capability of the bridge, user and/or network configuration information of the bridge formed by the UE and the network, so as to support implementation of time-sensitive networking.

Figure 9:
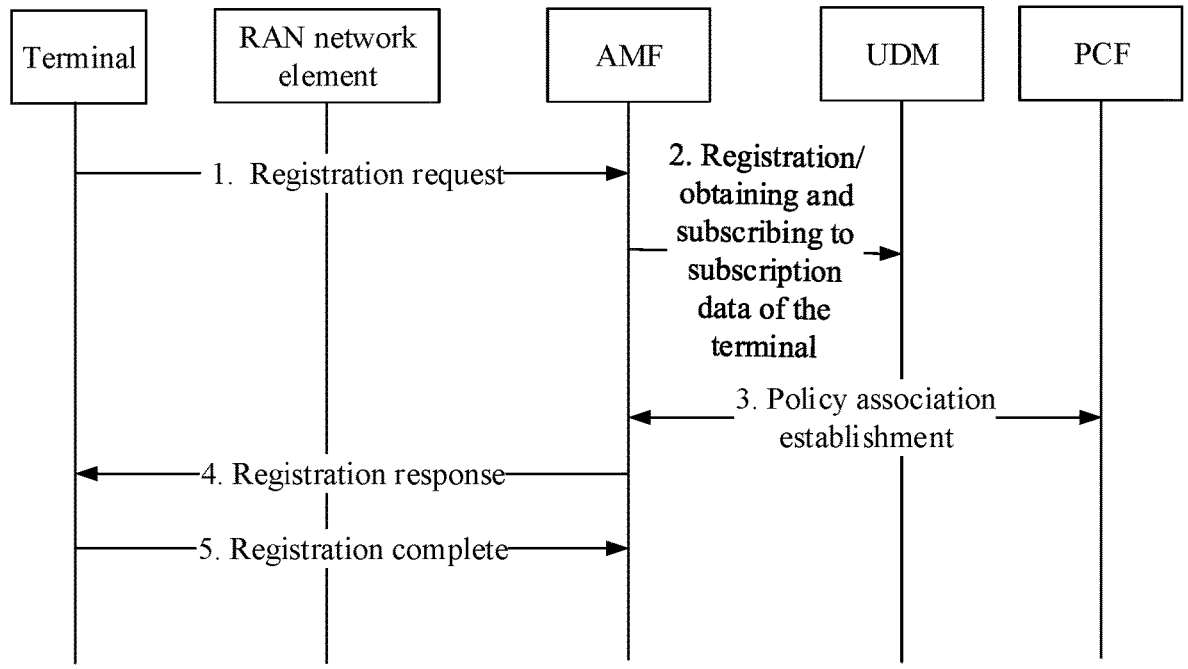
FIG. 9 is another schematic diagram of a method for supporting time-sensitive communication according to some embodiments of this disclosure.

Application scenario 2 in this embodiment of this disclosure:

In the application scenario 2 in this embodiment of this disclosure, a registration request process of UE is mainly described. Referring to FIG. 9, the following steps are included:

Step 1: The UE transmits a registration request message to an AMF, where the registration request message includes first information and/or second information (as described in the embodiment of FIG. 4), for example, first capability information of the UE, information related to a delay between the UE and a RAN network element, and a type of the UE.

Step 2: The AMF registers the terminal to a unified data management (UDM). The AMF may also obtain and subscribe to subscription data of the terminal.

Step 3: A policy association related to the UE is established between the AMF and a PCF. The AMF may obtain a policy of the terminal from the PCF.

Step 4: The AMF returns a registration response to the terminal.

Step 5: The terminal returns a registration complete to the AMF.

The AMF transmits the obtained first information and/or second information to the PCF. The PCF performs a first operation (as described in the embodiment of FIG. 5) of time sensitivity based on the first information and/or the second information, for example, determining a capability (such as a bridge delay) of a bridge formed by the UE and the network. The PCF transmits the capability of the bridge to an AF. The AF transmits the capability of the bridge to a CNC.

In some embodiments of this disclosure, in the UE registration process, the UE provides the first information to the network. The network may determine, based on the first information, the capability of the bridge formed by the UE and the network, and disclose the capability of the bridge to an external device (such as the CNC). The CNC may determine, based on the capability of the bridge, user and/or network configuration information of the bridge formed by the UE and the network. When receiving the user and/or network configuration information, the network may trigger the UE to establish a PDU session related to the bridge, so as to support implementation of time-sensitive networking.

Figure 10:
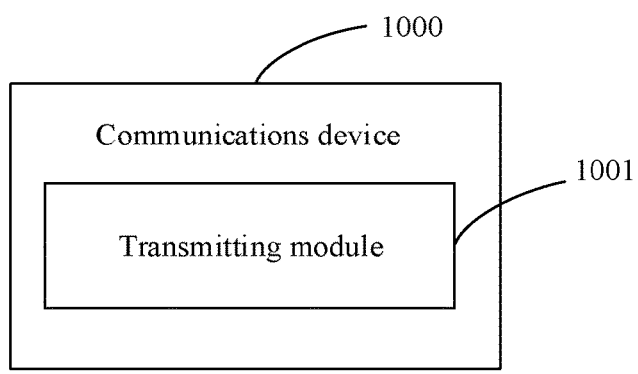
FIG. 10 is a structural diagram of a communications device according to this disclosure.

Referring to FIG. 10, some embodiments of this disclosure provide a communications device. The communications device is a first communications device. The first communications device includes, but is not limited to, UE. As shown in FIG. 10, the communications device 1000 includes:

a transmitting module 1001, configured to transmit first information and/or second information.

The first information includes at least one of the following:

first capability information of UE, and information related to a delay between the UE or a radio access network (RAN) network element.

The second information includes at least one of the following:

a type of the UE, a type of time-sensitive networking, or indication information of whether time-sensitive data stream configuration information is required.

Optionally, the first capability information of the UE includes at least one of the following:

bridge identification information of the UE, information about a bandwidth supported by the UE, processing delay information of the UE, or transmission propagation delay related information of the UE.

Optionally, the information about the bandwidth supported by the UE includes at least one of the following:

information related to a port, a bandwidth of the port, a bandwidth availability parameter of the port, or a transmission rate of the port.

Optionally, the transmission propagation delay related information of the UE includes at least one of the following:

information related to a port, a transmission propagation delay of the port, or a traffic class.

Optionally, the processing delay information of the UE includes at least one of the following:
information related to a port, a processing delay of the UE, and a traffic class.
Optionally, the information related to a port includes at least one of the following:
identification information of the port, information related to a direction of the port being an egress or an ingress, a port number, a MAC address of the port, an IP address of the port, a VLAN tag information associated with the port, or data filter information of the port.
Optionally, the data filter information of the port includes at least one of the following:
virtual local area network (VLAN) tag information, a media access control (MAC) address, an IPv4 address, a port number, an IPv6 address, or indication information of the port, where the indication information of the port includes indication information of a transmitting port or the indication information of a receiving port.
Optionally, the processing delay of the UE is at least one of the following:
information related to a data ingress port, information related to a data egress port, the processing delay of the UE, or a traffic class associated with a data packet.
Optionally, the processing delay of the UE includes at least one of the following:
a time required for transferring a data packet from a first bridge port of the UE to a second bridge port of the UE;
a time required for transferring a data packet from the second bridge port of the UE to the first bridge port of the UE;
a time required for transferring a data packet from a UU interface of the UE to a bridge port of the UE;
a time required for transferring a data packet from the bridge port of the UE to the UU interface of the UE; or
a time required from receiving a data packet at the bridge port of the UE until preparing to transmit the data packet at the UU interface of the UE.
The UU interface is an interface between the UE and a RAN.
Optionally, the information related to the delay between the UE and the RAN network element includes at least one of the following:
an end-to-end delay between the UE and the RAN network element, an air interface transmission delay between the UE and the RAN network element, a processing delay of the RAN, or the processing delay of the UE.
Optionally, the end-to-end delay between the UE and the RAN network element includes at least one of the following:
a time required from receiving a data packet at an N3 interface by the RAN network element until receiving the data packet by the UE;
a time required from transmitting a data packet by the UE to the RAN network element until transmitting the data packet by the RAN network element to the N3 interface;
a sum of the air interface transmission delay between the UE and the RAN network element and the processing delay of the RAN; or
a sum of the air interface transmission delay between the UE and the RAN network element, the processing delay of the RAN, and the processing delay of the UE.
Optionally, the processing delay of the RAN is:
a time required from receiving a data packet by the RAN network element until transmitting the data packet to the UE by the RAN network element.

Figure 11:
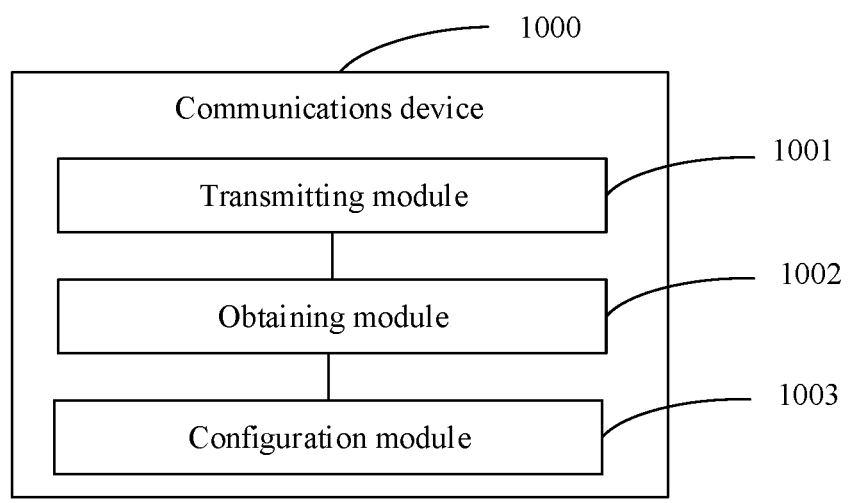
FIG. 11 is another structural diagram of a communications device according to this disclosure.
Figure 12:
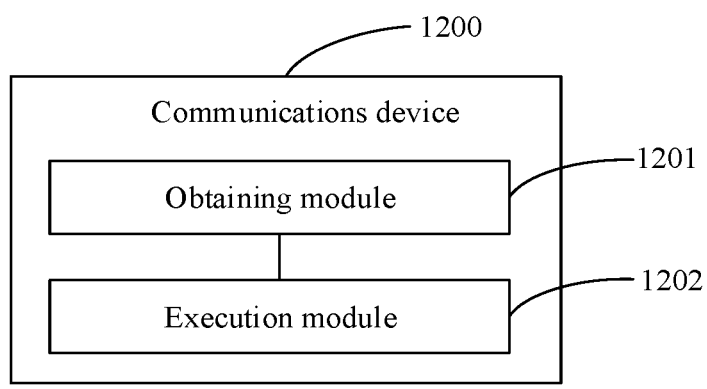
FIG. 12 is another structural diagram of a communications device according to this disclosure.

Optionally, the type of the UE includes one of the following:
bridge and end station; and/or
the type of time-sensitive networking includes one of the following:
fully distributed, fully centralized, and centralized-distributed hybrid.
Optionally, the transmitting the first information and/or the second information includes:
when a preset condition is satisfied, transmitting the first information and/or the second information.
The preset condition is at least one of the following:
a request for the first information is received from a network;
a request for the second information is received from the network;
the type of the UE is bridge; or
the UE supports time-sensitive communication.
Optionally, as shown in FIG. 11, the communications device 1000 further includes:
an obtaining module 1002, configured to obtain port configuration information, where the port configuration information includes at least one of the following: information related to a port, a bandwidth of the port, or a transmission rate of the port; and
a configuration module 1003, configured to configure the bandwidth and/or transmission rate of the port based on the port configuration information that is obtained.
Optionally, the transmitting the first information and/or the second information includes:
transmitting the first information and/or the second information to a target end.
The target end includes: a RAN network element and a core network CN network element.
The communications device 1000 is capable of implementing the processes implemented by the first communications device in the method embodiment of this disclosure, with the same beneficial effects achieved. To avoid repetition, details are not described herein again.
Referring to FIG. 12, some embodiments of this disclosure provide another communications device. The communications device is a second communications device. The second communications device includes, but is not limited to, a CN network element and a PCF. As shown in FIG. 12, the communications device 1200 includes:
an obtaining module 1201, configured to obtain first information, second information, and/or third information; and
an execution module 1202, configured to perform a first operation based on the first information, the second information, and/or the third information.
The first information includes at least one of the following:
first capability information of UE, and information related to a delay between the UE or a radio access network (RAN) network element.
The second information includes at least one of the following:
a type of the UE, a type of time-sensitive networking, or indication information of whether time-sensitive data stream configuration information is required.
The third information includes at least one of the following:
capability information of an anchor gateway or first transmission configuration information of a time-sensitive data stream.

Optionally, the first information is obtained from at least one of the following:
the UE, a first communications device, or a RAN network element currently accessed by the UE; and/or
the second information is obtained from at least one of the following:
the UE, the first communications device, or the RAN network element currently accessed by the UE; and/or
the third information is obtained from at least one of the following:
the UE or an anchor gateway.

Optionally, the first capability information of the UE includes at least one of the following:
bridge identification information of the UE, information about a bandwidth supported by the UE, processing delay information of the UE, or transmission propagation delay related information of the UE.

Optionally, the information about the bandwidth supported by the UE includes at least one of the following:
information related to a port, a bandwidth of the port, a bandwidth availability parameter of the port, or a transmission rate of the port.

Optionally, the transmission propagation delay related information of the UE includes at least one of the following:
information related to a port, a transmission propagation delay of the port, or a traffic class.

Optionally, the processing delay information of the UE includes at least one of the following:
information related to a port, a processing delay of the UE, or a traffic class.

Optionally, the information related to a port includes at least one of the following:
identification information of the port, information related to a direction of the port being an egress or an ingress, a port number, a MAC address of the port, an IP address of the port, a VLAN tag information associated with the port, or data filter information of the port.

Optionally, the data filter information of the port includes at least one of the following:
VLAN tag information, a media access control (MAC) address, an IPv4 address, a port number, an IPv6 address, or indication information of the port, where the indication information of the port includes indication information of a transmitting port or the indication information of a receiving port.

Optionally, the processing delay of the UE is at least one of the following:
information related to a data ingress port, information related to a data egress port, the processing delay of the UE, or a traffic class associated with a data packet.

Optionally, the processing delay of the UE includes at least one of the following:
a time required for transferring a data packet from a first bridge port of the UE to a second bridge port of the UE;
a time required for transferring a data packet from the second bridge port of the UE to the first bridge port of the UE;
a time required for transferring a data packet from a UU interface of the UE to a bridge port of the UE;
a time required for transferring a data packet from the bridge port of the UE to the UU interface of the UE; or
a time required from receiving a data packet at the bridge port of the UE until preparing to transmit the data packet at the UU interface of the UE.
The UU interface is an interface between the UE and a RAN.

Optionally, the information related to the delay between the UE and the RAN network element includes at least one of the following:
an end-to-end delay between the UE and the RAN network element, an air interface transmission delay between the UE and the RAN network element, a processing delay of the RAN, or the processing delay of the UE.

Optionally, the end-to-end delay between the UE and the RAN network element includes at least one of the following:
a time required from receiving a data packet at an N3 interface by the RAN network element until receiving the data packet by the UE;
a time required from transmitting a data packet by the UE to the RAN network element until transmitting the data packet by the RAN network element to the N3 interface;
a sum of the air interface transmission delay between the UE and the RAN network element and the processing delay of the RAN; or
a sum of the air interface transmission delay between the UE and the RAN network element, the processing delay of the RAN, and the processing delay of the UE.

Optionally, the processing delay of the RAN is:
a time required from receiving a data packet by the RAN network element until transmitting the data packet to the UE by the RAN network element.

Optionally, the type of the UE includes one of the following:
bridge and end station; and/or
the type of time-sensitive networking includes one of the following:
fully distributed, fully centralized, and centralized-distributed hybrid.

Optionally, the information related to the anchor gateway includes at least one of the following:
the capability information of the anchor gateway, information related to a delay between a RAN network element and the anchor gateway, or processing delay information of the anchor gateway.

Optionally, the capability information of the anchor gateway includes at least one of the following: bridge identification information of the anchor gateway, information about a bandwidth supported by the anchor gateway, a processing delay of the anchor gateway, or transmission propagation delay related information of the anchor gateway; and/or
the information related to the delay between the RAN network element and the anchor gateway includes at least one of the following:
a delay between the RAN network element and a connected gateway, a delay between N gateways, or the processing delay of the anchor gateway, where each inter-gateway delay is a delay between two gateways, and N is an integer greater than 1; and/or
the processing delay information of the anchor gateway includes at least one of the following:
information related to a data ingress port, information related to a data egress port, the processing delay of the anchor gateway, or a traffic class associated with a data packet.

Optionally, the information about the bandwidth supported by the anchor gateway includes at least one of the following:
information related to a port, a bandwidth of the port, or a transmission rate of the port; and/or the transmission propagation delay related information of the anchor gateway includes at least one of the following:

information related to a port, a transmission propagation delay of the port, or a traffic class.

Optionally, the first operation includes at least one of the following:

determining a capability of a bridge formed by the UE and a network;

determining second transmission configuration information of the time-sensitive data stream;

transmitting configuration information of the time-sensitive data stream, where the configuration information of the time-sensitive data stream is the first transmission configuration information of the time-sensitive data stream or the second transmission configuration information of the time-sensitive data stream;

determining bridge configuration information; or disclosing or transmitting the capability of the bridge formed by the UE and the network.

Optionally, the determining the internal delay of the bridge formed by the UE and the network includes at least one of the following:

determining the internal delay of the bridge formed by the UE and the network; or determining a bandwidth availability parameter of the bridge formed by the UE and the network.

Optionally, the determining the capability of the bridge formed by the UE and the network includes: determining the internal delay of the bridge formed by the UE and the network as one of the following:

a sum of the processing delay of the UE, the delay between the UE and the RAN network element, and the delay between the RAN network element and the anchor gateway; and a sum of the processing delay of the UE, the transmission delay between the UE and the RAN network element, a processing delay of the RAN network element, the delay between the RAN network element and the anchor gateway, and the processing delay of the anchor gateway.

Optionally, the transmitting configuration information of the time-sensitive data stream includes at least one of the following:

when a first condition is satisfied, transmitting the configuration information of the time-sensitive data stream to the UE; or when a second condition is satisfied, transmitting the configuration information of the time-sensitive data stream to the anchor gateway.

Optionally, the first condition includes at least one of the following:

the time-sensitive data stream is downlink data;

the type of the UE is bridge;

the architecture type of time-sensitive networking is fully distributed;

the UE is an end station and the architecture type of time-sensitive networking is centralized-distributed hybrid; or indication information for the configuration information of the time-sensitive data stream indicates that the configuration information of the time-sensitive data stream is required;

and/or the second condition includes at least one of the following:

the time-sensitive data stream is uplink data; or the architecture type of time-sensitive networking is fully distributed or centralized-distributed hybrid.

Figure 13:
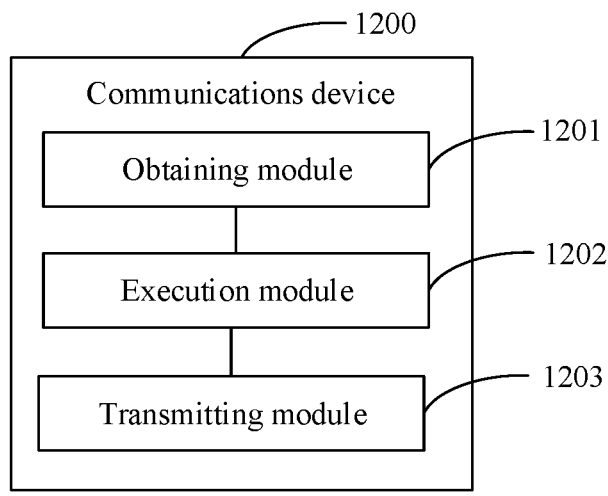
FIG. 13 is another structural diagram of a communications device according to this disclosure.

Optionally, as shown in FIG. 13, the communications device 1200 further includes:

a transmitting module 1203, configured to transmit the determined bridge configuration information to at least one of the following:

the UE or the anchor gateway.

Optionally, the bridge configuration information includes at least one of the following: information related to a port or a configured bandwidth of the port.

The communications device 1200 is capable of implementing the processes implemented by the second communications device in the method embodiment of this disclosure, with the same beneficial effects achieved. To avoid repetition, details are not described herein again.

Figure 14:
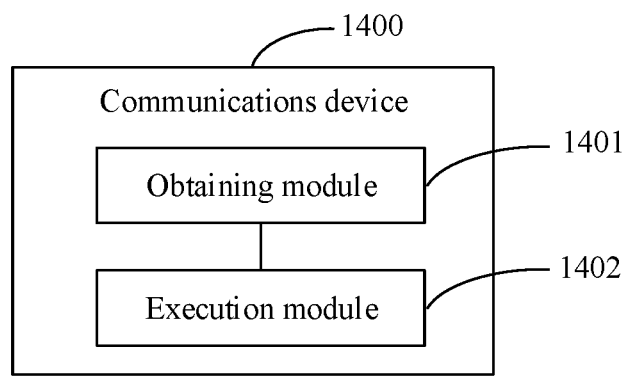
FIG. 14 is another structural diagram of a communications device according to this disclosure.

Referring to FIG. 14, some embodiments of this disclosure provide another communications device. The communications device is a third communications device. The third communications device includes, but is not limited to, UE or an anchor UPF. As shown in FIG. 14, the communications device 1400 includes:

an obtaining module 1401, configured to obtain bridge configuration information and/or configuration information of a time-sensitive data stream; and an execution module 1402, configured to perform a second operation of time-sensitive communication based on the bridge configuration information and/or the configuration information of the time-sensitive data stream.

Optionally, the bridge configuration information includes at least one of the following:

information related to a port, a bandwidth of the port, or a transmission rate of the port.

Optionally, the second operation includes:

configuring the bandwidth and/or transmission rate of the port based on obtained port configuration information.

The communications device 1400 is capable of implementing the processes implemented by the third communications device in the method embodiment of this disclosure, with the same beneficial effects achieved. To avoid repetition, details are not described herein again.

Figure 15:
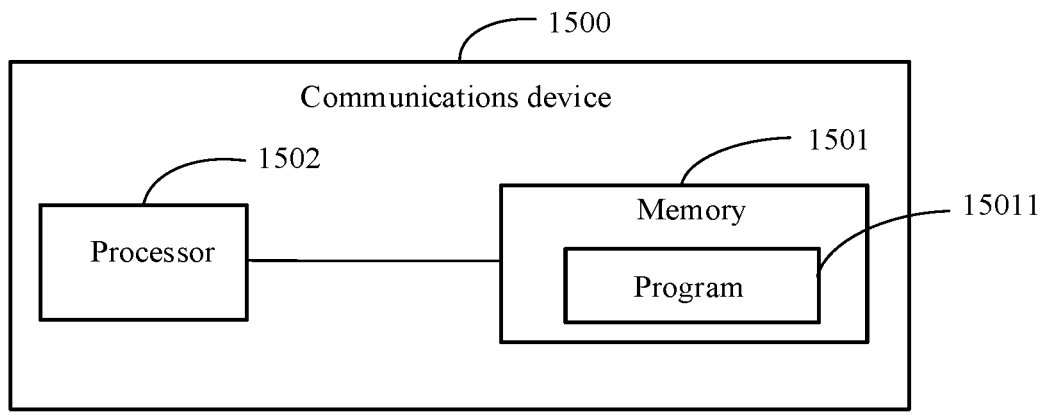
FIG. 15 is another structural diagram of a communications device according to this disclosure.

Referring to FIG. 15, FIG. 15 is a structural diagram 5 of a communications device according to some embodiments of this disclosure. As shown in FIG. 15, the communications device 1500 includes a memory 1501, a processor 1502, and a program 15011 stored on the memory 1501 and capable of running on the processor 1502.

When the communications device 1500 acts as the first communications device in the foregoing method embodiment, the following steps are implemented when the program 15011 is executed by the processor 1502:

transmitting first information and/or second information.

The first information includes at least one of the following:

first capability information of UE, and information related to a delay between the UE or a radio access network (RAN) network element.

The second information includes at least one of the following:

a type of the UE, a type of time-sensitive networking, or indication information of whether time-sensitive data stream configuration information is required.

Optionally, the first capability information of the UE includes at least one of the following:

bridge identification information of the UE, information about a bandwidth supported by the UE, processing delay information of the UE, or transmission propagation delay related information of the UE.

Optionally, the information about the bandwidth supported by the UE includes at least one of the following:

information related to a port, a bandwidth of the port, a bandwidth availability parameter of the port, or a transmission rate of the port.

Optionally, the transmission propagation delay related information of the UE includes at least one of the following:

information related to a port, a transmission propagation delay of the port, or a traffic class.

Optionally, the processing delay information of the UE includes at least one of the following:

information related to a port, a processing delay of the UE, or a traffic class.

Optionally, the information related to a port includes at least one of the following:

identification information of the port, information related to a direction of the port being an egress or an ingress, a port number, a MAC address of the port, an IP address of the port, a VLAN tag information associated with the port, or data filter information of the port.

Optionally, the data filter information of the port includes at least one of the following:

VLAN tag information, a MAC address, an IPv4 address, a port number, an IPv6 address, or indication information of the port, where the indication information of the port includes indication information of a transmitting port or the indication information of a receiving port.

Optionally, the processing delay of the UE is at least one of the following:

information related to a data ingress port, information related to a data egress port, the processing delay of the UE, or a traffic class associated with a data packet.

Optionally, the processing delay of the UE includes at least one of the following:

a time required for transferring a data packet from a first bridge port of the UE to a second bridge port of the UE;

a time required for transferring a data packet from the second bridge port of the UE to the first bridge port of the UE;

a time required for transferring a data packet from a UU interface of the UE to a bridge port of the UE;

a time required for transferring a data packet from the bridge port of the UE to the UU interface of the UE; or a time required from receiving a data packet at the bridge port of the UE until preparing to transmit the data packet at the UU interface of the UE.

The UU interface is an interface between the UE and a RAN.

Optionally, the information related to the delay between the UE and the RAN network element includes at least one of the following:

an end-to-end delay between the UE and the RAN network element, an air interface transmission delay between the UE and the RAN network element, a processing delay of the RAN, or the processing delay of the UE.

Optionally, the end-to-end delay between the UE and the RAN network element includes at least one of the following:

a time required from receiving a data packet at an N3 interface by the RAN network element until receiving the data packet by the UE;

a time required from transmitting a data packet by the UE to the RAN network element until transmitting the data packet by the RAN network element to the N3 interface;

a sum of the air interface transmission delay between the UE and the RAN network element and the processing delay of the RAN; or a sum of the air interface transmission delay between the UE and the RAN network element, the processing delay of the RAN, and the processing delay of the UE.

Optionally, the processing delay of the RAN is:

a time required from receiving a data packet by the RAN network element until transmitting the data packet to the UE by the RAN network element.

Optionally, the type of the UE includes one of the following:

bridge and end station; and/or the type of time-sensitive networking includes one of the following:

fully distributed, fully centralized, and centralized-distributed hybrid.

Optionally, the transmitting the first information and/or the second information includes:

when a preset condition is satisfied, transmitting the first information and/or the second information; where the preset condition is at least one of the following:

a request for the first information is received from a network;

a request for the second information is received from the network;

the type of the UE is bridge; or the UE supports time-sensitive communication.

Optionally, after the step of transmitting the first information and/or the second information, the processor 1502 is further configured to:

obtain port configuration information, where the port configuration information includes at least one of the following: information related to a port, a bandwidth of the port, or a transmission rate of the port; and configure the bandwidth and/or transmission rate of the port based on the port configuration information that is obtained.

Optionally, the transmitting the first information and/or the second information includes:

transmitting the first information and/or the second information to a target end.

The target end includes: a RAN network element and a core network CN network element.

When the communications device 1500 acts as the second communications device in the foregoing method embodiment, the following steps are implemented when the program 15011 is executed by the processor 1502:

obtaining first information, second information, and/or third information; and performing a first operation based on the first information, the second information, and/or the third information.

The first information includes at least one of the following:

first capability information of UE, and information related to a delay between the UE or a radio access network (RAN) network element.

The second information includes at least one of the following:

a type of the UE, a type of time-sensitive networking, or indication information of whether time-sensitive data stream configuration information is required.

The third information includes at least one of the following:

capability information of an anchor gateway or first transmission configuration information of a time-sensitive data stream.

Optionally, the first information is obtained from at least one of the following:
the UE, a first communications device, or a RAN network element currently accessed by the UE; and/or
the second information is obtained from at least one of the following:
the UE, the first communications device, or the RAN network element currently accessed by the UE; and/or
the third information is obtained from at least one of the following: the UE or an anchor gateway.

Optionally, the first capability information of the UE includes at least one of the following:
bridge identification information of the UE, information about a bandwidth supported by the UE, processing delay information of the UE, or transmission propagation delay related information of the UE.

Optionally, the information about the bandwidth supported by the UE includes at least one of the following:
information related to a port, a bandwidth of the port, a bandwidth availability parameter of the port, or a transmission rate of the port.

Optionally, the transmission propagation delay related information of the UE includes at least one of the following:
information related to a port, a transmission propagation delay of the port, or a traffic class.

Optionally, the processing delay information of the UE includes at least one of the following:
information related to a port, a processing delay of the UE, or a traffic class.

Optionally, the information related to a port includes at least one of the following:
identification information of the port, information related to a direction of the port being an egress or an ingress, a port number, a MAC address of the port, an IP address of the port, a VLAN tag information associated with the port, or data filter information of the port.

Optionally, the data filter information of the port includes at least one of the following:
VLAN tag information, a media access control (MAC) address, an IPv4 address, a port number, an IPv6 address, or indication information of the port, where the indication information of the port includes indication information of a transmitting port or the indication information of a receiving port.

Optionally, the processing delay of the UE is at least one of the following:
information related to a data ingress port, information related to a data egress port, the processing delay of the UE, or a traffic class associated with a data packet.

Optionally, the processing delay of the UE includes at least one of the following:
a time required for transferring a data packet from a first bridge port of the UE to a second bridge port of the UE;
a time required for transferring a data packet from the second bridge port of the UE to the first bridge port of the UE;
a time required for transferring a data packet from a UU interface of the UE to a bridge port of the UE;
a time required for transferring a data packet from the bridge port of the UE to the UU interface of the UE; or
a time required from receiving a data packet at the bridge port of the UE until preparing to transmit the data packet at the UU interface of the UE.

The UU interface is an interface between the UE and a RAN.

Optionally, the information related to the delay between the UE and the RAN network element includes at least one of the following:
an end-to-end delay between the UE and the RAN network element, an air interface transmission delay between the UE and the RAN network element, a processing delay of the RAN, or the processing delay of the UE.

Optionally, the end-to-end delay between the UE and the RAN network element includes at least one of the following:
a time required from receiving a data packet at an N3 interface by the RAN network element until receiving the data packet by the UE;
a time required from transmitting a data packet by the UE to the RAN network element until transmitting the data packet by the RAN network element to the N3 interface;
a sum of the air interface transmission delay between the UE and the RAN network element and the processing delay of the RAN; or
a sum of the air interface transmission delay between the UE and the RAN network element, the processing delay of the RAN, and the processing delay of the UE.

Optionally, the processing delay of the RAN is:
a time required from receiving a data packet by the RAN network element until transmitting the data packet to the UE by the RAN network element.

Optionally, the type of the UE includes one of the following:
bridge and end station; and/or
the type of time-sensitive networking includes one of the following:
fully distributed, fully centralized, and centralized-distributed hybrid.

Optionally, information related to the anchor gateway includes at least one of the following:
the capability information of the anchor gateway, information related to a delay between a RAN network element and the anchor gateway, or processing delay information of the anchor gateway.

Optionally, the capability information of the anchor gateway includes at least one of the following: bridge identification information of the anchor gateway, information about a bandwidth supported by the anchor gateway, a processing delay of the anchor gateway, or transmission propagation delay related information of the anchor gateway; and/or
the information related to the delay between the RAN network element and the anchor gateway includes at least one of the following:
a delay between the RAN network element and a connected gateway, a delay between N gateways, or the processing delay of the anchor gateway, where each inter-gateway delay is a delay between two gateways, and N is an integer greater than 1; and/or
the processing delay information of the anchor gateway includes at least one of the following:
information related to a data ingress port, information related to a data egress port, the processing delay of the anchor gateway, or a traffic class associated with a data packet.

Optionally, the information about the bandwidth supported by the anchor gateway includes at least one of the following:
information related to a port, a bandwidth of the port, or a transmission rate of the port; and/or the transmission propagation delay related information of the anchor gateway includes at least one of the following:
information related to a port, a transmission propagation delay of the port, or a traffic class.

Optionally, the first operation includes at least one of the following:
determining a capability of a bridge formed by the UE and a network;
determining second transmission configuration information of the time-sensitive data stream;
transmitting configuration information of the time-sensitive data stream, where the configuration information of the time-sensitive data stream is the first transmission configuration information of the time-sensitive data stream or the second transmission configuration information of the time-sensitive data stream;
determining bridge configuration information; or
disclosing or transmitting the capability of the bridge formed by the UE and the network.

Optionally, the determining the internal delay of the bridge formed by the UE and the network includes at least one of the following:
determining the internal delay of the bridge formed by the UE and the network;
determining a bandwidth availability parameter of the bridge formed by the UE and the network.

Optionally, the determining the capability of the bridge formed by the UE and the network includes: determining the internal delay of the bridge formed by the UE and the network as one of the following:
a sum of the processing delay of the UE, the delay between the UE and the RAN network element, and the delay between the RAN network element and the anchor gateway; and
a sum of the processing delay of the UE, the transmission delay between the UE and the RAN network element, a processing delay of the RAN network element, the delay between the RAN network element and the anchor gateway, and the processing delay of the anchor gateway.

Optionally, the transmitting configuration information of the time-sensitive data stream includes at least one of the following:
when a first condition is satisfied, transmitting the configuration information of the time-sensitive data stream to the UE; or
when a second condition is satisfied, transmitting the configuration information of the time-sensitive data stream to the anchor gateway.

Optionally, the first condition includes at least one of the following:
the time-sensitive data stream is downlink data;
the type of the UE is bridge;
the architecture type of time-sensitive networking is fully distributed;
the UE is an end station and the architecture type of time-sensitive networking is centralized-distributed hybrid; or
indication information for the configuration information of the time-sensitive data stream indicates that the configuration information of the time-sensitive data stream is required;
and/or
the second condition includes at least one of the following:
the time-sensitive data stream is uplink data; or
the architecture type of time-sensitive networking is fully distributed or centralized-distributed hybrid.

Optionally, after the step of performing the first operation, the processor 1502 is further configured to:
transmit the determined bridge configuration information to at least one of the following:
the UE or an anchor gateway.

Optionally, the bridge configuration information includes at least one of the following: information related to a port or a configured bandwidth of the port.

When the communications device 1500 acts as the third communications device in the foregoing method embodiment, the following steps are implemented when the program 15011 is executed by the processor 1502:
obtaining bridge configuration information and/or configuration information of a time-sensitive data stream; and
performing a second operation of time-sensitive communication based on the bridge configuration information and/or the configuration information of the time-sensitive data stream.

Optionally, the bridge configuration information includes at least one of the following:
information related to a port, a bandwidth of the port, or a transmission rate of the port.

Optionally, the second operation includes:
configuring the bandwidth and/or transmission rate of the port based on obtained port configuration information.

The communications device 1500 is capable of implementing each process implemented by the communications device in the foregoing method embodiments. To avoid repetition, details are not described herein again.

Some embodiments of this disclosure further provides a computer-readable storage medium. The computer-readable storage medium stores a computer program, and when the computer program is executed by a processor, the processes of the embodiment of the method for supporting time-sensitive communication are implemented, with the same technical effect achieved. To avoid repetition, details are not described herein again. The computer-readable storage medium is, for example, a read-only memory (ROM for short), a random access memory (RAM for short), a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The storage medium may include: a magnetic disk, an optical disc, a read-only memory (ROM), or a random access memory (RAM).

It may be understood that the embodiments described in this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . ." does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for supporting time-sensitive communication, performed by a user equipment (UE) and comprising:
   transmitting first information to a target end;
   wherein the first information comprises:
   first capability information of the UE;
   the first capability information of the UE comprises:
      processing delay information of the UE;
   the processing delay of the UE comprises at least one of the following:
      a time required for transferring a data packet from a UU interface of the UE to a bridge port of the UE; or
      a time required for transferring a data packet from the bridge port of the UE to the UU interface of the UE;
   wherein the target end is a core network (CN) network element of the bridge, and
   the bridge further comprises the UE,
   a Centralized Network configuration (CNC) is located at the outside of the bridge.

2. The method according to claim 1,
   wherein the first capability information of the UE further comprises at least one of the following:
   bridge identification information of the UE, or
   information about a bandwidth supported by the VE.

3. The method according to claim 2,
   wherein the information about the bandwidth supported by the UE comprises at least one of the following:
      information related to the port,
      a bandwidth of the port,
      a bandwidth availability parameter of the port, or
      a transmission rate of the port;

and/or
  the processing delay information of the UE comprises at least one of the following:
    information related to the port, or
    a traffic class;
  wherein the information related to the port comprises at least one of the following:
    identification information of the port,
    information related to a direction of the port being an egress or an ingress,
    a port number,
    a media access control (MAC) address of the port,
    an IP address of the port,
    virtual local area network (VLAN) tag information associated with the port, or
    data filter information of the port.

4. The method according to claim 1,
  wherein the first information further comprises at least one of the following:
    information related to a data ingress port,
    information related to a data egress port, or
    a traffic class associated with a data packet.

5. The method according to claim 1,
  wherein the processing delay of the UE further comprises at least one of the following:
    a time required for transferring a data packet from a first bridge port of the UE to a second bridge port of the UE; or
    a time required for transferring a data packet from the second bridge port of the UE to the first bridge port of the UE;
  wherein the UU interface is an interface between the UE and a RAN.

6. The method according to claim 1, wherein the method further comprises
  transmitting second information to the target end;
  the second information comprises at least one of the following:
    a type of the UE,
    a type of time-sensitive networking, or
    indication information of whether time-sensitive data stream configuration information is required;
  the type of the UE comprises one of the following:
    bridge or
    end station;
  and/or
  the type of time-sensitive networking comprises one of the following:
    fully distributed,
    fully centralized, or
    centralized-distributed hybrid.

7. The method according to claim 6,
  wherein the transmitting the first information comprises:
    when a preset condition is satisfied, transmitting the first information;
  wherein the preset condition is at least one of the following:
    a request for the first information is received from a network;
    the type of the UE is bridge; or
    the UE supports time-sensitive communication.

8. The method according to claim 1,
  wherein after the step of transmitting the first information, the method further comprises:
    obtaining port configuration information,
    wherein the port configuration information comprises information related to the port and at least one of the following:
      a bandwidth of the port, or
      a transmission rate of the port; and
    configuring the bandwidth and/or transmission rate of the port based on the port configuration information that is obtained.

9. The method according to claim 1,
  wherein the first capability information of the UE further comprises transmission propagation delay related information of the UE; and
  the transmission propagation delay related information of the UE comprises a transmission propagation delay of a port, and
  the transmission propagation delay of a port is a time required for transferring a data frame from a port of the UE to a port of a bridge or an end station; and
  the processing delay information of the UE comprises a processing delay of the UE.

10. A method for supporting time-sensitive communication, performed by a core network (CN) network element and comprising:
  obtaining first information from a user equipment (UE),
  wherein the CN network element is a target end of a bridge, and the bridge further comprises the UE; and
  performing a first operation based on the first information;
  wherein the first information comprises:
    first capability information of the UE, the first capability information of the UE comprises: processing delay information of the UE;
    the processing delay of the UE comprises at least one of the following:
      a time required for transferring a data packet from a UU interface of the UE to a bridge port of the UE; or
      a time required for transferring a data packet from the bridge port of the UE to the UU interface of the UE;
  wherein a Centralized Network configuration (CNC) is located at the outside of the bridge.

11. The method according to claim 10,
  wherein the first capability information of the UE further comprises at least one of the following: bridge identification information of the UE, or information about a bandwidth supported by the UE.

12. The method according to claim 11,
  wherein the information about the bandwidth supported by the UE comprises at least one of the following: information related to the port, a bandwidth of the port, a bandwidth availability parameter of the port, or a transmission rate of the port; and/or
  the processing delay information of the UE comprises at least one of the following:
    information related to the port, or
    a traffic class;
  wherein the information related to the port comprises at least one of the following: identification information of the port, information related to a direction of the port being an egress or an ingress, a port number, a media access control (MAC) address of the port, an IP address of the port, virtual local area network (VLAN) tag information associated with the port, or data filter information of the port.

13. The method according to claim 10,
  wherein the processing delay of the UE is one of the following: information related to a data ingress port, information related to a data egress port, or a traffic class associated with a data packet.

14. The method according to claim 10,
wherein the processing delay of the UE further comprises at least one of the following:
a time required for transferring a data packet from a first bridge port of the UE to a second bridge port of the UE; or
a time required for transferring a data packet from the second bridge port of the UE to the first bridge port of the UE;
wherein the UU interface is an interface between the UE and a RAN.

15. The method according to claim 10,
wherein the type of the UE comprises one of the following:
bridge or end station; and/or
the type of time-sensitive networking comprises one of the following:
fully distributed,
fully centralized, or
centralized-distributed hybrid.

16. A communications device, comprising a processor, a memory, and a program stored in the memory and capable of running on the processor,
wherein when the program is executed by the processor, the steps of the method for supporting time-sensitive communication according to claim 10 are implemented.

17. The communications device according to claim 16,
wherein the first capability information of the UE further comprises transmission propagation delay related information of the UE; and
the transmission propagation delay related information of the UE comprises a transmission propagation delay of a port, and the transmission propagation delay of a port is a time required for transferring a data frame from a port of the UE to a port of a bridge or an end station; and
the processing delay information of the UE comprises a processing delay of the UE.

18. The method according to claim 10,
wherein the first capability information of the UE further comprises transmission propagation delay related information of the UE; and
the transmission propagation delay related information of the UE comprises a transmission propagation delay of a port, and the transmission propagation delay of a port is a time required for transferring a data frame from a port of the UE to a port of a bridge or an end station; and
the processing delay information of the UE comprises a processing delay of the UE.

19. A user equipment (UE), comprising a processor, a memory, and a program stored in the memory and capable of running on the processor, wherein when the program is executed by the processor, the following step is implemented:
transmitting first information to a target end;
wherein the first information comprises:
first capability information of the UE;
the first capability information of the UE comprises at least one of the following:
processing delay information of the UE;
the processing delay of the UE comprises at least one of the following:
a time required for transferring a data packet from a UU interface of the UE to a bridge port of the UE; or
a time required for transferring a data packet from the bridge port of the UE to the UU interface of the UE;
wherein the target end is a CN network element of the bridge, and the bridge further comprises the UE,
a Centralized Network configuration (CNC) is located at the outside of the bridge.

20. The UE according to claim 19,
wherein the first capability information of the UE further comprises transmission propagation delay related information of the UE; and
the transmission propagation delay related information of the UE comprises a transmission propagation delay of a port, and
the transmission propagation delay of a port is a time required for transferring a data frame from a port of the UE to a port of a bridge or an end station; and
the processing delay information of the UE comprises a processing delay of the UE.

* * * * *